(12) United States Patent
Watanabe et al.

(10) Patent No.: US 7,708,479 B2
(45) Date of Patent: May 4, 2010

(54) IMAGING DEVICE AND PORTABLE INFORMATION TERMINAL DEVICE

(75) Inventors: Nobuaki Watanabe, Tokyo (JP);
Yoshiyuki Ohzeki, Tokyo (JP);
Mitsutaka Hidaka, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 284 days.

(21) Appl. No.: 11/911,906

(22) PCT Filed: Apr. 27, 2006

(86) PCT No.: PCT/JP2006/308815
§ 371 (c)(1),
(2), (4) Date: Oct. 18, 2007

(87) PCT Pub. No.: WO2006/118180
PCT Pub. Date: Nov. 9, 2006

(65) Prior Publication Data
US 2009/0052886 A1 Feb. 26, 2009

(30) Foreign Application Priority Data
Apr. 28, 2005 (JP) ............................. 2005-133310

(51) Int. Cl.
*G03B 9/40* (2006.01)
*G03B 9/26* (2006.01)
*G03B 9/20* (2006.01)
*H04N 5/238* (2006.01)
*G02B 9/08* (2006.01)

(52) U.S. Cl. ...................... 396/488; 396/489; 396/485; 396/494; 396/497; 396/506; 396/510; 348/342; 348/363; 359/723; 359/739

(58) Field of Classification Search ......... 396/484–488, 396/490, 493, 494, 497, 501, 506, 510; 348/342, 348/360, 363; 359/722, 723, 738, 739; 455/422.1, 455/556.1, 556.2, 575.1
See application file for complete search history.

(56) References Cited

U.S. PATENT DOCUMENTS

| | | | |
|---|---|---|---|
| 6,817,788 B1 * | 11/2004 | Negishi et al. ............... | 396/505 |
| 2003/0122957 A1 * | 7/2003 | Emme ........................ | 348/370 |
| 2005/0179779 A1 * | 8/2005 | Oochi et al. ........... | 348/207.99 |

FOREIGN PATENT DOCUMENTS

| | | |
|---|---|---|
| JP | 1-108877 | 4/1989 |
| JP | 5-292388 | 11/1993 |
| JP | 7-21373 | 1/1995 |
| JP | 11-203452 | 7/1999 |
| JP | 2003-333392 | 11/2003 |
| JP | 2004-344375 | 12/2004 |

* cited by examiner

*Primary Examiner*—Rochelle-Ann J Blackman
(74) *Attorney, Agent, or Firm*—Wenderoth, Lind & Ponack, L.L.P.

(57) ABSTRACT

An imaging device and a portable information terminal device of the present invention include: a blade driving unit (20) made up of a base plate (21) having an opening portion (21a) serving as an optical path, an infrared light cut filter blade (23) movably supported by the base plate between a receded position displaced from the opening portion and a position facing the opening portion, and a first electromagnetic driving source (26) that drives the infrared light cut filter blade (23); a lens optical system (32, 33, 34) arranged on the optical path passing through the opening portion; an imaging element (42) that images an object through the lens optical system; and a control unit (51) that drives and controls the blade driving unit (20) and the imaging element (42). The control unit drives and controls the first electromagnetic driving source (26) so as to move the infrared light cut filter blade (23) to the receded position when using an infrared light. In this way, the infrared light cut filter blade is provided so as to be able to recede from the opening portion, so that the normal imaging can be performed, and at the same time, the biometric information (blood vessel image) for authentication can be also imaged.

18 Claims, 15 Drawing Sheets

US 7,708,479 B2

IMAGING DEVICE AND PORTABLE INFORMATION TERMINAL DEVICE

TECHNICAL FIELD

The present invention relates to an imaging device comprising authentication functions of an operator, and in particular, it relates to an imaging device mounted on a portable information terminal device such as a portable telephone, a portable personal computer, and a portable music player so as to image biometric information at the time of authenticating an operator, thereby performing authentication, and a portable information terminal device mounted with this imaging device.

BACKGROUND ART

As a conventional authentication device that identifies an operator, there is known a device (for example, see Patent Document 1) in which the side surface of a portable telephone is provided with a sensor that reads biometric information such as a vein shape, a pulse wave, and a finger print of the finger of the operator, and the information read by the sensor is transmitted to a user management system including a WEB server and a management server, thereby performing the authentication of the operator.

However, in the sensor adopted in this device, no specific configuration is disclosed to know how to read (image) the biometric information regarding the vein and the like of the finger of the operator by the configuration.

As another identifying device, there is known a device (for example, see Patent Document 2) in which a light source that irradiates an infrared light and a visible light on the finger of the operator respectively, a dicroic mirror that separates the light from the finger into the visible light and the infrared light, a lens arranged at the back of the dicroic mirror, a CCD (imaging element) arranged at the back of the lens and the like are provided, and by imaging a blood vessel image of the finger, it is compared with the registered blood vessel image, thereby performing an individual authentication.

However, in this device, the number of components is large, and the structure is complicated, and it is difficult to mount this device on a portable telephone and the like.

As still another identifying device, there is known a device (for example, see Patent Document 3), in which an irradiating unit comprising a light source and an optical fiber to irradiate an illumination light on the finger of the operator, a visible light cut filter that cuts the visible light from the white light transmitting the finger, and a lens and a CCD and the like arranged at the back of the visible light cut filer are provided, and the blood vessel image of the finger is imaged by the CCD, and it is compared with the registered blood image, thereby performing the individual authentication.

However, since this device is configured to have the infrared light always impinge into the CCD (imaging element), even when the CCD can be used only for imaging the blood vessel image, when an ordinary object is imaged, the freshness of the image is reduced, and it is difficult to apply the CCD as an ordinary digital camera (imaging device).

On the other hand, in the ordinary digital camera, while an infrared light cut filter that shields the infrared light is arranged in front of the CCD (imaging element), in the configuration having both this infrared light cut filter and the above-mentioned visible light cut filter, it is difficult to clearly image the blood vessel image and the like, and the structure becomes complicated, which leads to the increase in the device size and high cost.

Patent Document 1: Unexamined Japanese Patent Publication No. 2004-344375
Patent Document 2: Unexamined Japanese Patent Publication No. 11-203452
Patent Document 3: Unexamined Japanese Patent Publication No. 7-21373

DISCLOSURE OF THE INVENTION

Problem to be Solved by the Invention

The present invention has been developed in view of the above-mentioned problems of the conventional arts, and an object of the present invention is to provide a small imaging device, in which the number of component parts is reduced as much as possible so as to realize the simplification of the structure and low cost, and the authentication of an operator can be performed by a simple technique, and at the same time, an imaging of an ordinary object can be performed, and in particular, the device can be mounted on a portable information terminal device, such as a portable telephone, a portable personal computer, and a portable music player, and provide a portable information terminal device mounting this device.

Means for Solving Problem

An imaging device of the present invention includes: a blade driving unit including a base plate having an opening portion serving as an optical path, a blade member movably supported by the base plate between a receded position displaced from the opening portion and a position facing the opening portion, and an electromagnetic driving source that drives the blade member; a lens optical system arranged on the optical path passing through the opening portion; an imaging element that images an object through the lens optical system; and a control unit that drives and controls the blade driving unit and the imaging element. The blade member includes an infrared light cut filter blade that shuts off an infrared light to the imaging element, and the control unit drives and controls the electromagnetic driving source so as to move the infrared light cut filter blade to the receded position at the time of using the infrared light.

According to this configuration, for example, when an operator turns on a power source of this imaging device and the device is put into an authentication mode of the operator using an infrared light, the control unit drives the infrared light cut filter blade so as to be moved to the receded position deviated from the opening portion, and the infrared light transmitting the finger and the like of the operator placed in front of the opening portion enters the imaging element through the lens, thereby forming a blood vessel image. Consequently, this blood vessel image is compared with the pre-registered image, so that the authentication can be performed. On the other hand, in an ordinary mode that performs a common imaging after being authorized by the authentication, since the infrared light cut filter blade is kept positioned at the position facing the opening portion, the infrared light entering the imaging element is shut off, and therefore, a brilliant color imaging image of the object can be obtained.

In this way, by making the infrared light cut filter blade movable to the opening portion, an ordinary imaging can be performed in the ordinary mode without using the infrared light, and at the same time, in the authentication mode using the infrared light, the biometric information (blood vessel image) of the operator can be also imaged.

In the imaging device of the configuration, the electromagnetic driving source can adopt a configuration in which the infrared light cut filter blade is positioned and held at the position facing the opening portion in a non-energization state except when using the infrared light.

According to this configuration, in the ordinary mode that images an ordinary object without using the infrared light, since the infrared light cut filter blade is positioned and held at the position facing the opening portion in a non-energization state, power consumption can be reduced, and when this imaging device is mounted on a small-size portable information terminal device such as a portable telephone, the power source can be made small in size, and this can contribute to the miniaturization of the entire device.

In the imaging device of the configuration, the infrared light cut filter blade can adopt a configuration in which the blade is arranged at any of a position close to an object side or to the imaging element side relative to the lens optical system, and a position intervened in the lens optical system.

According to this configuration, in a state in which the imaging element is arranged at the back of the lens optical system, the infrared light cut filter blade is arranged closer to a front side than the lens optical system or closer to a rear side than the lens optical system or between lenses of the lens optical system, and therefore, a free arrangement is made possible according to various specifications. Particularly, by arranging the blade close to the imaging element side, the ingress of the infrared light into the imaging element can be more reliably prevented in the ordinary mode that performs the ordinary imaging without using the infrared light.

In the image device of the configuration, the blade member includes a shutter blade that opens and closes the opening portion in addition to the infrared light cut filter blade, and the electromagnetic driving source can adopt a configuration in which a first electromagnetic driving source that drives the infrared light cut filer blade and a second electromagnetic driving source that drives the shutter blade are included.

According to this configuration, a shutter function is obtained by driving the infrared light cut filter blade by the first electromagnetic driving source and by driving to open or close the shutter blade by the second electromagnetic driving source, and therefore, not only is it a matter of course to be able to use the shutter function by the ordinary imaging without using the infrared light, but also it is possible to allow the shutter function to operate if necessary even by the imaging of a living body in the authentication mode using the infrared light.

In the imaging device of the configuration, the infrared light cut filter blade and the shutter blade can adopt a configuration to be arranged at any of a position close to an object side or to the imaging element side relative to the lens optical system, and a position intervened inside the lens optical system.

According to this configuration, in a state in which the imaging element is arranged at the back of the lens optical system, the infrared light cut filter blade and the shutter blade are arranged together closer to the front side than the lens optical system, closer to the back side than the lens optical system, or between lenses of the lens optical system, and therefore, while achieving the miniaturization and the simplification of the structure, a free arrangement is made possible according to various specifications. Particularly, by arranging the blades close to the imaging element side, the ingress of the infrared light into the imaging element can be more reliably prevented in the ordinary mode that performs the ordinary imaging without using the infrared light.

In the imaging device of the configuration, a configuration can be adopted such that one of the infrared light cut filter blade and the shutter blade is arranged close to an object side relative to the lens optical system, and the other of the infrared light cut filter blade and the shutter blade is arranged close to the imaging element side relative to the lens optical system.

According to this configuration, the infrared light cut filter blade and the shutter blade are isolated, and each is arranged in front of or at the back of the lens optical system, and therefore, the device is suitable for the case where a gap of the front side of the lens optical system and a gap of the back side (back focus) of the lens optical system are narrow.

In the imaging device of the configuration, the blade member may be configured to include a light quantity adjustment blade that stops down the opening portion to a predetermined aperture or covers the opening portion so as to reduce the light quantity in addition to the infrared light cut filter blade, and the electromagnetic driving source may be configured to include a first electromagnetic driving source that drives the infrared light cut filter blade and a third electromagnetic driving source that drives the light quantity adjustment blade.

According to this configuration, a light quantity adjustment function is obtained by driving the infrared light cut filter blade by the first electromagnetic driving source and by driving the light quantity adjustment blade by the third electromagnetic driving source, and therefore, not only is it a matter of course to be able to use the light quantity adjustment function by the ordinary imaging without using the infrared light, but also it is possible to allow the light quantity adjustment function to operate if necessary even by the imaging of a living body in the authentication mode using the infrared light.

In the imaging device of the configuration, a configuration can be adopted such that the infrared light cut filter blade and the light quantity adjustment blade are arranged at any of a position close to an object side or to the imaging element side relative to the lens optical system, and a position intervened inside the lens optical system.

According to this configuration, in a state in which the imaging element is arranged at the back of the lens optical system, the infrared light cut filter blade and the light quantity adjustment blade are arranged together closer to the front side than the lens optical system, closer to the back side than the lens optical system, or between lenses of the lens optical system, and therefore, while achieving the miniaturization and the simplification of the structure, free arrangement is made possible according to various specifications. Particularly, by arranging the blades close to the imaging element side, the ingress of the infrared light into the imaging element can be more reliably prevented in the ordinary mode that performs the ordinary imaging without using the infrared light.

In the imaging device of the configuration, a configuration can be adopted such that one of the infrared light cut filter blade and the light quantity adjustment blade is arranged close to an object side relative to the lens optical system and the other of the infrared light cut filter blade and the light quantity adjustment blade is arranged close to the imaging element side relative to the lens optical system.

According to this configuration, the infrared light cut filter blade and the light quantity adjustment blade are isolated, and each is arranged in front of or at the back of the lens optical system, and therefore, the device is suitable for the case where a gap of the front side of the lens optical system and a gap of the back side (back focus) of the lens optical system are narrow.

In the imaging device of the configuration, a configuration can be adopted such that the blade member includes a shutter blade that opens and closes the opening portion and a light quantity adjustment blade that stops down the opening portion to a predetermined aperture or covers the opening portion so as to reduce the light quantity in addition to the infrared light cut filter blade, and the electromagnetic driving source includes a first electromagnetic driving source that drives the infrared light cut filter blade, a second electromagnetic driving source that drives to open and close the shutter blade, and a third electromagnetic driving source that drives the light quantity adjustment blade.

According to this configuration, the infrared light cut filter blade is driven by the first electromagnetic driving source, and at the same time, the shutter blade is driven to be opened or closed by the second electromagnetic driving source, so that a shutter function can be obtained, and the light quantity adjustment blade is driven by the third electromagnetic driving source, so that a light quantity adjustment function can be obtained, and therefore, not only is it a matter of course to be able to use the shutter function and the light quantity adjustment function by the ordinary imaging without using the infrared light, but also it is possible to allow the shutter function and the light quantity adjustment function to operate if necessary even by the imaging of a living body in vivo in the authentication mode using the infrared light.

In the imaging device of the configuration, a configuration can be adopted such that support shafts of the infrared light cut filter blade, the shutter blade, and the light quantity adjustment blade are arranged in a periphery of the opening portion, and the first electromagnetic driving source, the second electromagnetic driving source, and the third electromagnetic driving source are arranged in the periphery of the opening portion.

According to this configuration, in the configuration including the infrared light cut filer blade and the first electromagnetic driving source, the shutter blade and the second electromagnetic driving source, and the light quantity adjustment blade and the third electromagnetic driving source, by arranging these blades and driving sources in the periphery of the opening portion, the integration of the component parts are performed with the opening portion as a center, so that the miniaturization of the imaging device, and moreover, the miniaturization of a portable telephone and the like mounting the imaging device can be achieved.

In the imaging device of the configuration, a configuration can be adopted such that the infrared light cut filter blade, the shutter blade, and the light quantity adjustment blade are arranged at any of a position close to an object side or to the imaging element side relative to the lens optical system, and a position intervened inside the lens optical system.

According to this configuration, in a state in which the imaging element is arranged at the back of the lens optical system, the infrared cut filter blade, the shutter blade, and the light quantity adjustment blade are arranged together closer to the front side than the lens optical system, closer to the back side than the lens optical system, or between lenses of the lens optical system, and therefore, while achieving the miniaturization and the simplification of the structure, free arrangement is made possible according to various specifications. Particularly, by arranging the blades close to the imaging element side, the ingress of the infrared light into the imaging element can be more reliably prevented in the ordinary mode that performs the ordinary imaging without using the infrared light.

In the imaging device of the configuration, a configuration is adopted such that the infrared light cut filter blade is arranged close to one side of an object side and the imaging element side relative to the lens optical system and the shutter blade and the light quantity adjustment blade are arranged close to the other side of the object side and the imaging element side relative to the lens optical system.

According to this configuration, the shutter blade and the light quantity adjustment blade are isolated together from the infrared light cut filter blade, and are arranged in front of or at the back of the lens optical system respectively, and therefore, the device is suitable for the case where a gap in the front side of the lens optical system and a gap at the back side (back focus) of the lens optical system are narrow.

In the imaging device of the configuration, a configuration can be adopted such that the infrared light cut filter blade includes a pair of blades defining an opening having a predetermined aperture and an infrared light cut filter sandwiched between and joined to the pair of blades.

According to this configuration, since the infrared light cut filter forms a laminating structure sandwiched between the pair of blades, the mechanical strength becomes higher, and the infrared light cut filter can be prevented from having a bruise, and moreover, a punching tool and the like can be shared, and the production cost and the like can be reduced.

In the imaging device of the configuration, a configuration can be adopted such that the infrared light cut filter blade includes a blade defining an opening having a predetermined aperture and an infrared light cut filer joined to a surface of one side of the blade so as to cover at least the opening.

According to this configuration, comparing with the infrared light cut filer blade of the laminating structure, the blade can be made thin and light in weight, and moreover, the imaging device can be made thin.

In the imaging device of the configuration, a configuration can be adopted such that a storage unit that stores information regarding an operator in advance, a comparing unit that compares image information on the operator imaged by the imaging element when using the infrared light with an information from the storage unit, and a judgment unit that judges a propriety of the operator based on a comparison result of the comparing unit are included.

According to this configuration, the information on an operator authorized for the operation (for example, the information regarding the blood vessel image of the finger) is stored in the storage unit in advance, and when the operator turns on the power and intends to start operating, the information (for example, the blood vessel image) on the finger and the like of the operator is imaged by the imaging element, and the imaged image is compared with the stored image by the comparing unit, so that the propriety as to whether the operator is a person primarily authorized is judged by the judgment unit. In this way, in the authentication mode using the infrared light, since the authentication of the operator is reliably executed based on a series of the processes, the authentication can be performed quickly and at high accuracy.

A portable information terminal device of the present invention includes: a blade driving unit including a base plate having an opening portion serving as an optical path, a blade member movably supported by the base plate between a receded position deviated from the opening portion and a position facing the opening portion, and an electromagnetic driving source that drives the blade member; a lens optical system arranged on the optical path passing through the opening portion; an imaging element that images an object through the lens optical system; and a control unit that performs drive-controls of the blade driving unit and the imaging element and controls of the entirety. The blade member includes an infrared light cut filter blade that shuts off an infrared light into the imaging element, and the control unit drive-controls the electromagnetic driving source so as to move the infrared light cut filter blade to a receded position when using the infrared light.

According to this configuration, when an operator turns on the power of this portable information terminal device and the device is put into the authentication mode of the operator using the infrared light, the control unit drive-controls the infrared light cut filter blade so as to be moved to the receded position deviated from the opening portion, and the infrared light transmitting the finger and the like of the operator placed in front of the opening portion enters the imaging element through the lens so as to form the blood vessel image. Consequently, this blood vessel image can be compared with a previously registered image, thereby performing the authentication. On the other hand, in the normal mode that performs an ordinary imaging without using the infrared light after authorized by the authentication, the infrared light cut filter blade is positioned at the position facing the opening portion, and therefore, the infrared light entering the imaging element is shut off, and a brilliant color imaged image of the object can be obtained.

In this way, by making the infrared light cut filter blade movable to the opening portion, an ordinary imaging can be performed in the normal mode without using the infrared light in the portable information terminal device, and at the same time, the biometric information (blood vessel image) on the operator can be also imaged in the authentication mode using the infrared light.

In the portable information terminal device of the configuration, a configuration can be adopted such that a storage unit that stores an information regarding the operator in advance, a comparing unit that compares an image information on the operator imaged by the imaging element when using the infrared light with an information from the storage unit, and a judgment unit that judges a propriety of the operator based on a comparison result of the comparing unit are included.

According to this configuration, the information (for example, the information regarding the blood vessel image of the finger) of the operator authorized for the operation is stored in the storage unit in advance, and when the operator turns on the power and intends to start operating, the information (for example, the blood vessel image) on the finger and the like of the operator is imaged by the imaging element, and the imaged image is compared with a stored image by the comparing unit, and the propriety as to whether the operator is the person primarily authorized is judged by the judgment unit. In this way, in the authentication mode using the infrared light, since the authentication of the operator is reliably executed based on a series of the processes, the authentication can be performed quickly and at high precision.

In the portable information terminal device of the configuration, a configuration can be adapted in which a display unit that displays information regarding a judgment result of the judgment unit is included.

According to this configuration, since the display unit (for example, a liquid crystal monitor and the like) displays the information regarding the judgment result, for example, when the operator is a person disqualified and primarily not authorized, the display unit can display a warning about it.

In the portable information terminal device of the configuration, a configuration can be adopted in which the control unit, when the judgment unit judges the operator as disqualified, sets the subsequent operation by that operator disabled.

According to this configuration, when the judgment unit judges the operator as disqualified, the control unit sets the subsequent operation disabled (for example, the power is automatically turned off), and therefore, when the person not authorized can be prevented from taking the liberty of operating the portable information terminal device.

Advantageous Effect of the Invention

According to the imaging device and the portable information terminal device of the present invention configured as above, an imaging device can be obtained in which the number of component parts is reduced as much as possible, and while achieving the simplification of the structure and the low cost, the authentication of the operator can be performed by a simple technique, and at the same time, an ordinary imaging of the object can be performed, and moreover, by mounting this imaging device, a portable information terminal device such as a small type portable telephone, a portable personal computer, and a portable music player that combine an authentication function and an imaging function can be obtained.

Figure 1:
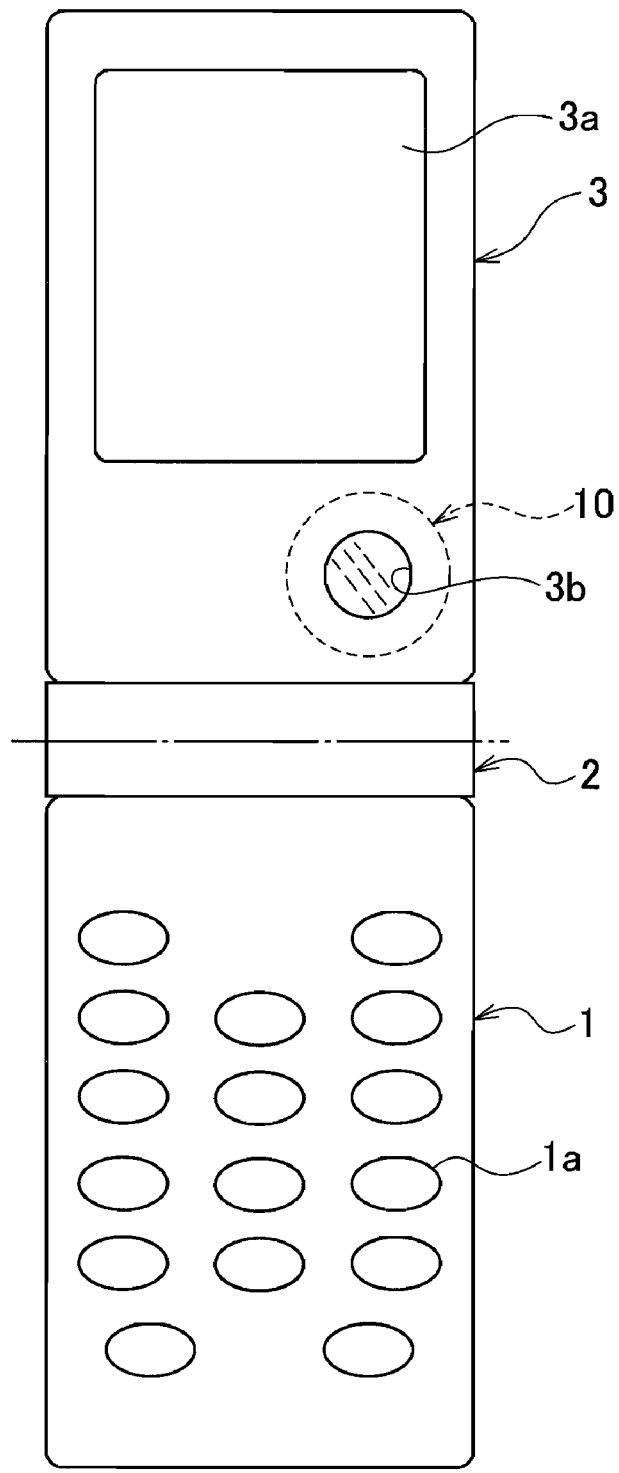
FIG. 1 is a front view showing a portable telephone as a portable information terminal device mounting an imaging device according to the present invention.

EXPLANATION OF LETTERS OR NUMERALS 1 main body of portable telephone
2 hinge portion
3 lid body of portable telephone
3b imaging window
10 imaging device 20, 20', 20" blade driving unit
21 main plate (base plate)
21a opening portion
21c, 21d, 21d support shaft
22 back plate (base plate)
22a opening portion
23 infrared light cut filter blade (blade member)
23' a pair of blades
23" infrared light cut filter
24 shutter blade (blade member)
25 diaphragm blade (blade member, light quantity adjustment blade)
26 first electromagnetic driving source
27 second electromagnetic driving source
28 third electromagnetic driving source
30, 130, 230, 330 lens unit
31, 131, 231, 332 lens frame
32, 132, 232, 332 first lens (lens optical system)
33, 133, 233, 333 second lens (lens optical system)
34, 134, 234, 334 third lens (lens optical system)
40 imaging unit
41 circuit board
42 CCD (imaging element)
50 control circuit
51 control unit (CPU)
52 CCD driving circuit
53 first driving circuit
54 second diving circuit
55 third driving circuit
56 image processing circuit
57 storage unit
58 comparing unit
59 judgment unit
60 display unit
123 infrared light cut filter blade (blade member)
123' blade
123" infrared light cut filter
125, 225 ND filter blade (blade member, light quantity adjustment blade)

BEST MODE FOR CARRYING OUT THE INVENTION

Hereinafter, the best mode for carrying out the present invention will be explained with reference to the accompanying drawings.

Here, an explanation will be made on a case where an imaging device according to the present invention is mounted on a portable telephone as a portable information terminal device.

This portable telephone includes, as shown in FIG. 1, a main body 1 arranged with a plurality of operation buttons 1a and storing various control circuits, electronic parts, and the like therein, a lid body 3 joined to the main body 1 so as to be freely opened and closed through a hinge portion 2 and carrying a liquid crystal display unit 3a that displays information, an imaging device 10 built-in at the back of an imaging window 3b of the lid body 3, and the like. Note that the imaging device 10 may be built into the main body 1 or the hinge portion 2.

Figure 2:
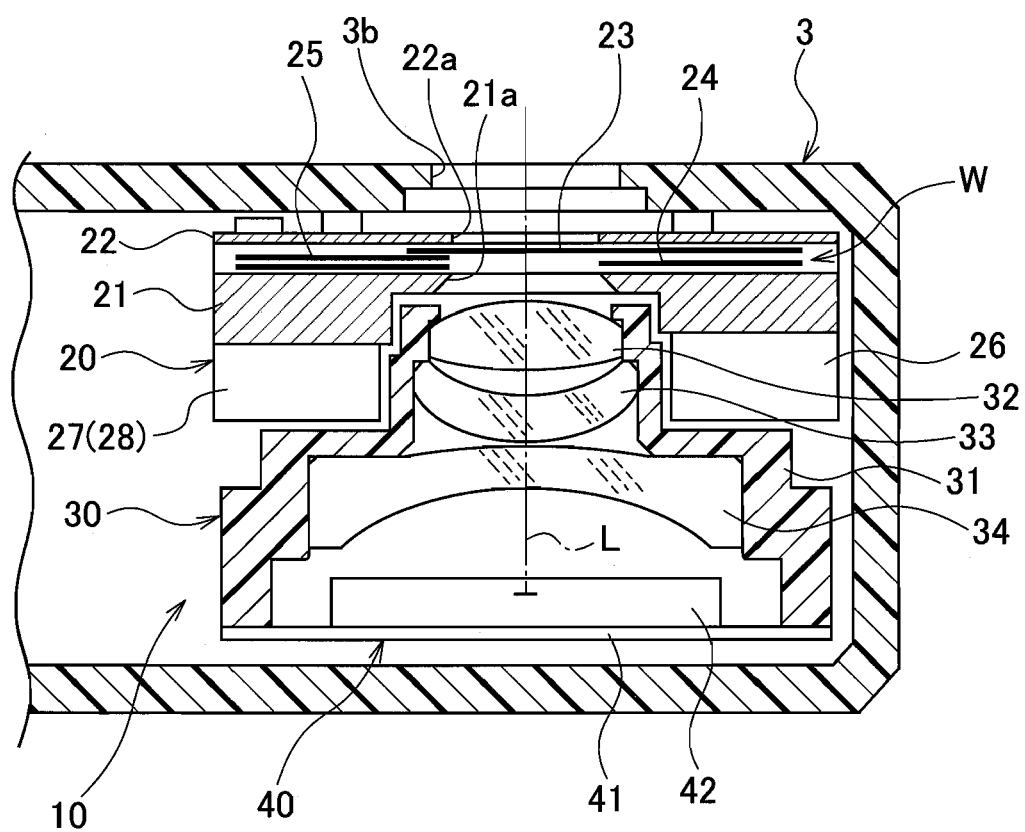
FIG. 2 is a partially sectional view showing the imaging device mounted on the portable telephone of FIG. 1.
Figure 9:
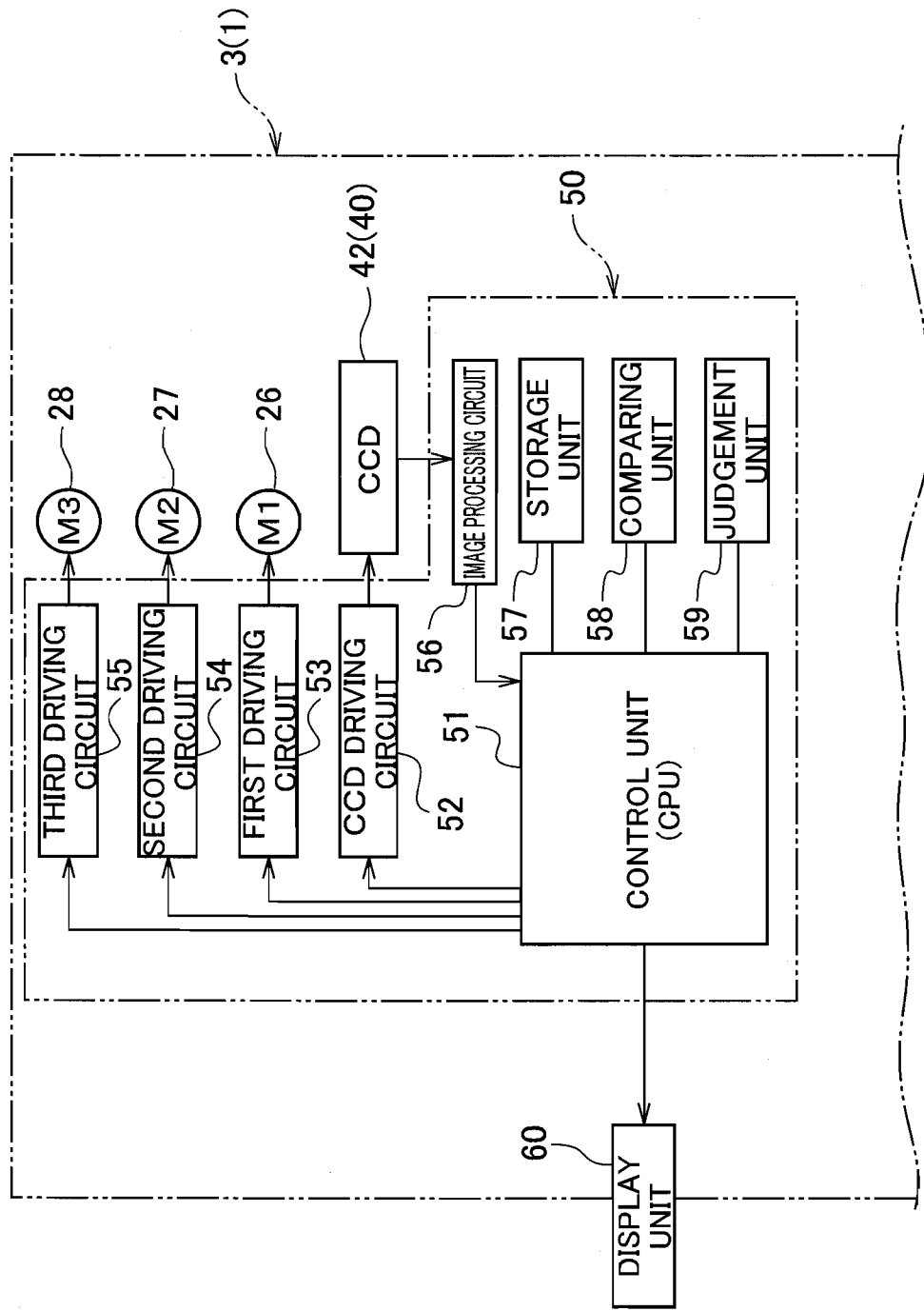
FIG. 9 is a block diagram showing a control circuit included in the portable telephone shown in FIG. 1.

The imaging device 10, as shown in FIGS. 2 and 9, includes a blade driving unit 20, a lens unit 30 forming a lens optical system, an imaging unit 40, and the like, which are arranged in order from the side close to the imaging window 3b, thereby forming a camera unit.

Figure 3:
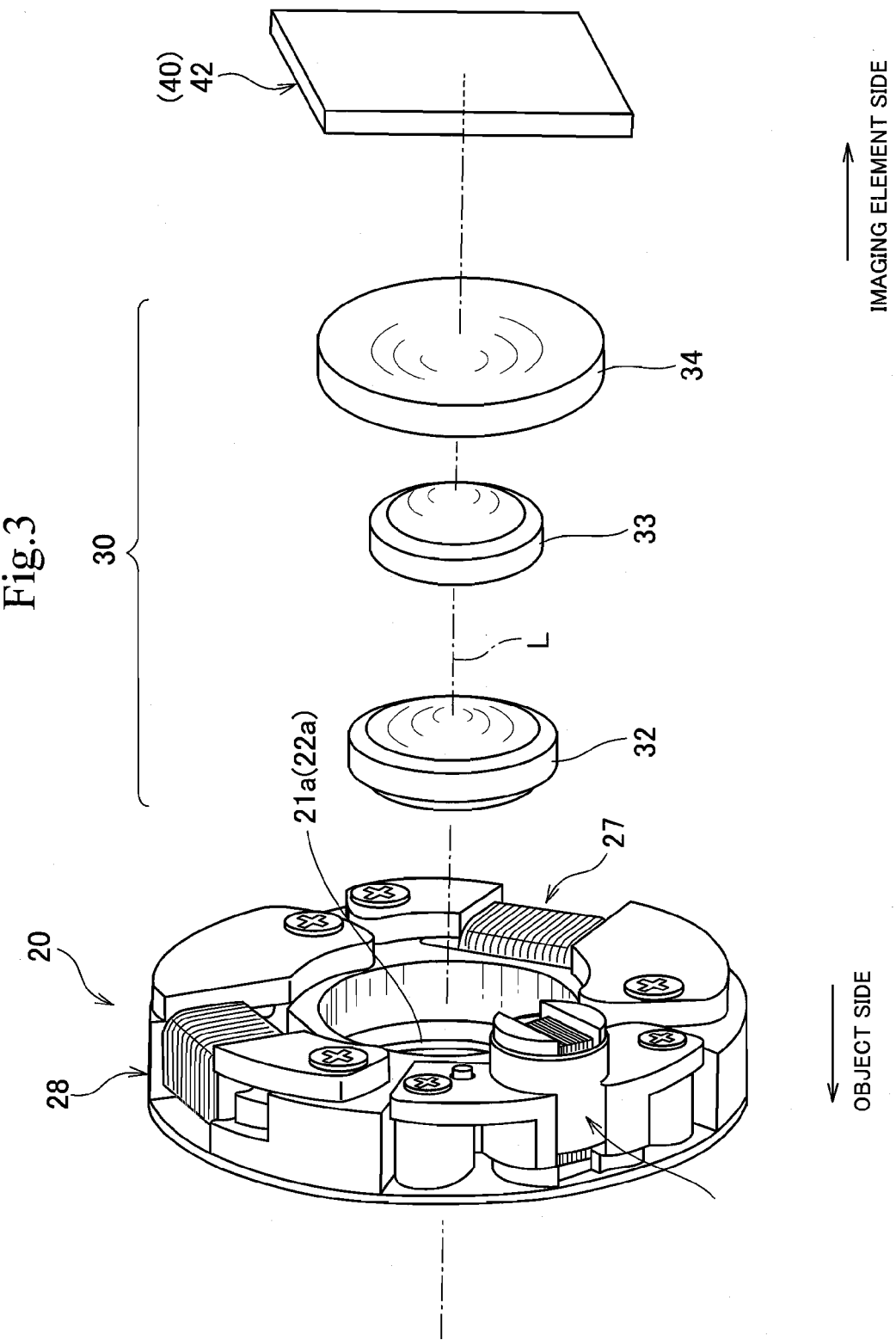
FIG. 3 is an exploded perspective view of the imaging device mounted on the portable telephone of FIG. 1.
Figure 4:
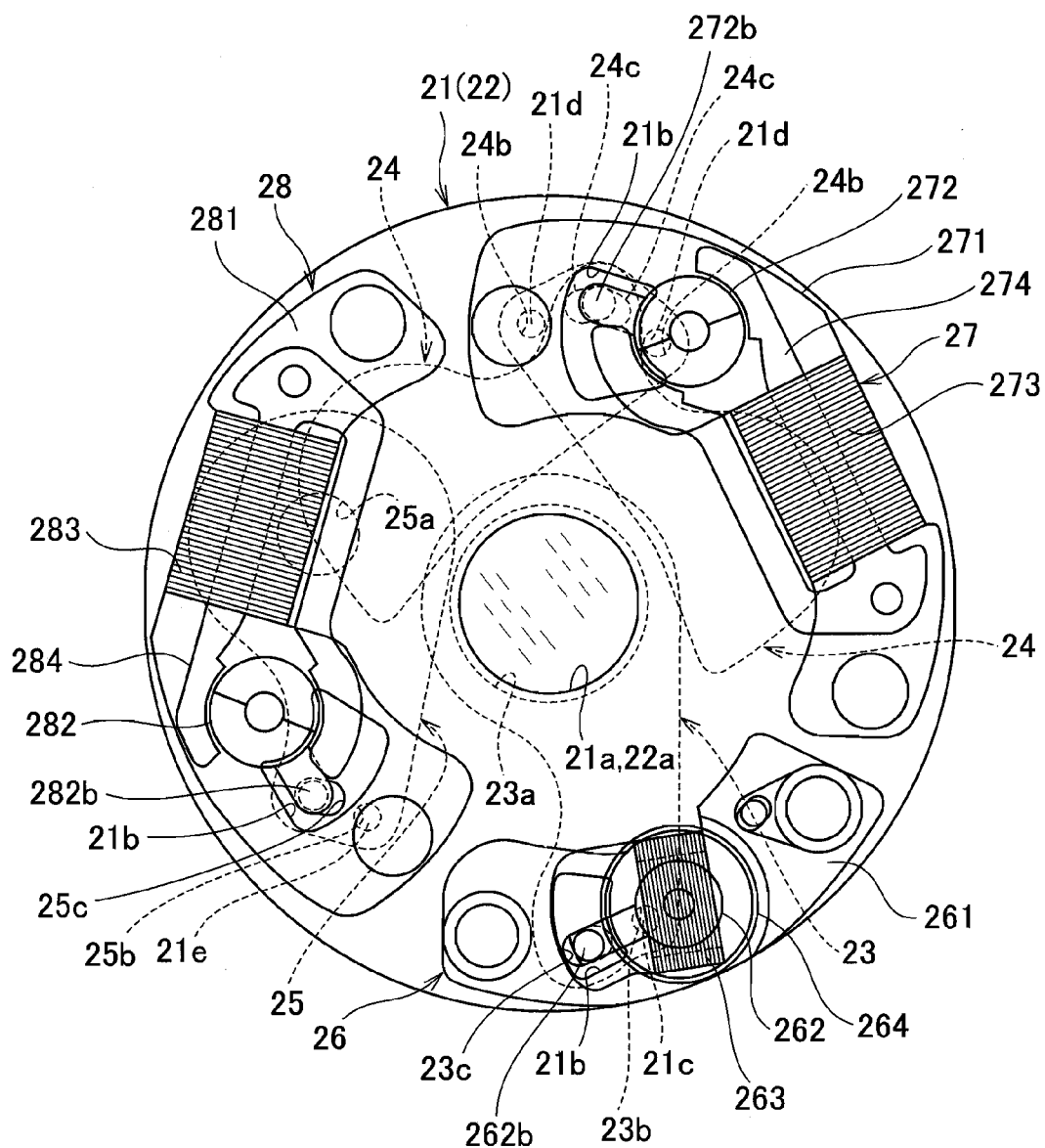
FIG. 4 is a plan view showing a blade driving unit that is a part of the imaging device.

The blade driving unit 20, as shown in FIGS. 2 to 4, is arranged closer to an object side than the lens unit 30 in the direction to an optical axis L, and is made up of a main plate 21 and a back plate 22 as a base plate having opening portions 21a and 22a serving as optical paths; an infrared light cut filter blade 23, a shutter blade 24 as blade members, and an diaphragm blade 25 as a light quantity adjustment blade, movably supported respectively by the main plate 21 between a receded position deviated from the opening portions 21a and 22a and a position facing the opening portions 21a and 22b; a first electromagnetic driving source 26 for driving the infrared light cut filter blade 23; a second electromagnetic blade 27 for driving the shutter blade 24; a third electromagnetic driving source 28 for driving the aperture blade 25; and the like.

The main plate 21, as shown in FIGS. 2, 3, 4, 5, 7, and 8, is formed approximately in the shape of a disc, and is provided with the opening portion 21a serving as the optical path formed in its center, three approximately fan-shaped penetration holes 21b formed around the opening portion 21a, four support shafts 21c, 21d, 21d, and 21e formed by protruding from one surface of the main plate 21 and rotatably supporting the infrared light cut filter blade 23, the shutter blade 24 and the diaphragm blade 25 respectively, six fixing boss portions 21f formed by protruding from the other surface of the main plate 21 and for fixing three electromagnetic driving sources 26, 27, and 28 respectively, and the like.

Figure 5:
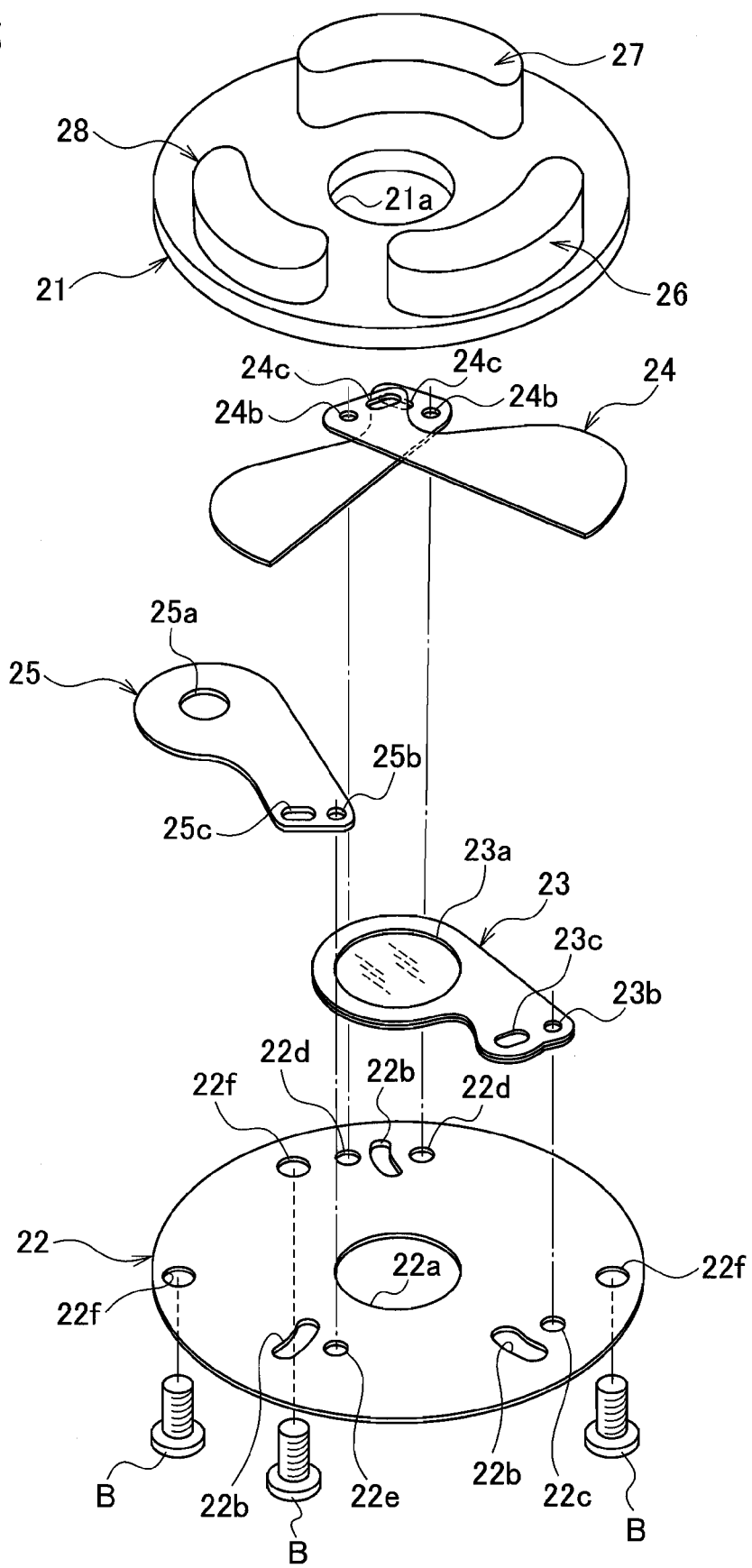
FIG. 5 is an exploded perspective view showing the blade driving unit that is a part of the imaging device.

The back plate 22, as shown in FIG. 5, is formed approximately in the shape of a disc, and is provided with the portion 22a serving as the optical path formed in its center, three long holes 22b formed around the opening portion 22a and allowing driving pins 262b, 272b, and 282b to be explained later to pass through, four circular holes 22c, 22d, 22d, 22e which are formed close to the long hole 22b and in which the support shafts 21c, 21d, 21d and 21e are fitted respectively, three screw holes 22f allowing screws B to pass through, and the like.

The main plate 21 and the back plate 22, as shown in FIG. 2, are fastened by the screws B so as to define a blade chamber W which rotatably stores the infrared light cut filter blade 23, the shutter blade 24, and the diaphragm blade 25. Note that the opening portions 21a and 22a are coaxially arranged on the imaging window 3b (on the optical axis L) in a state in which the imaging device 10 is mounted on the portable telephone.

Figure 6:
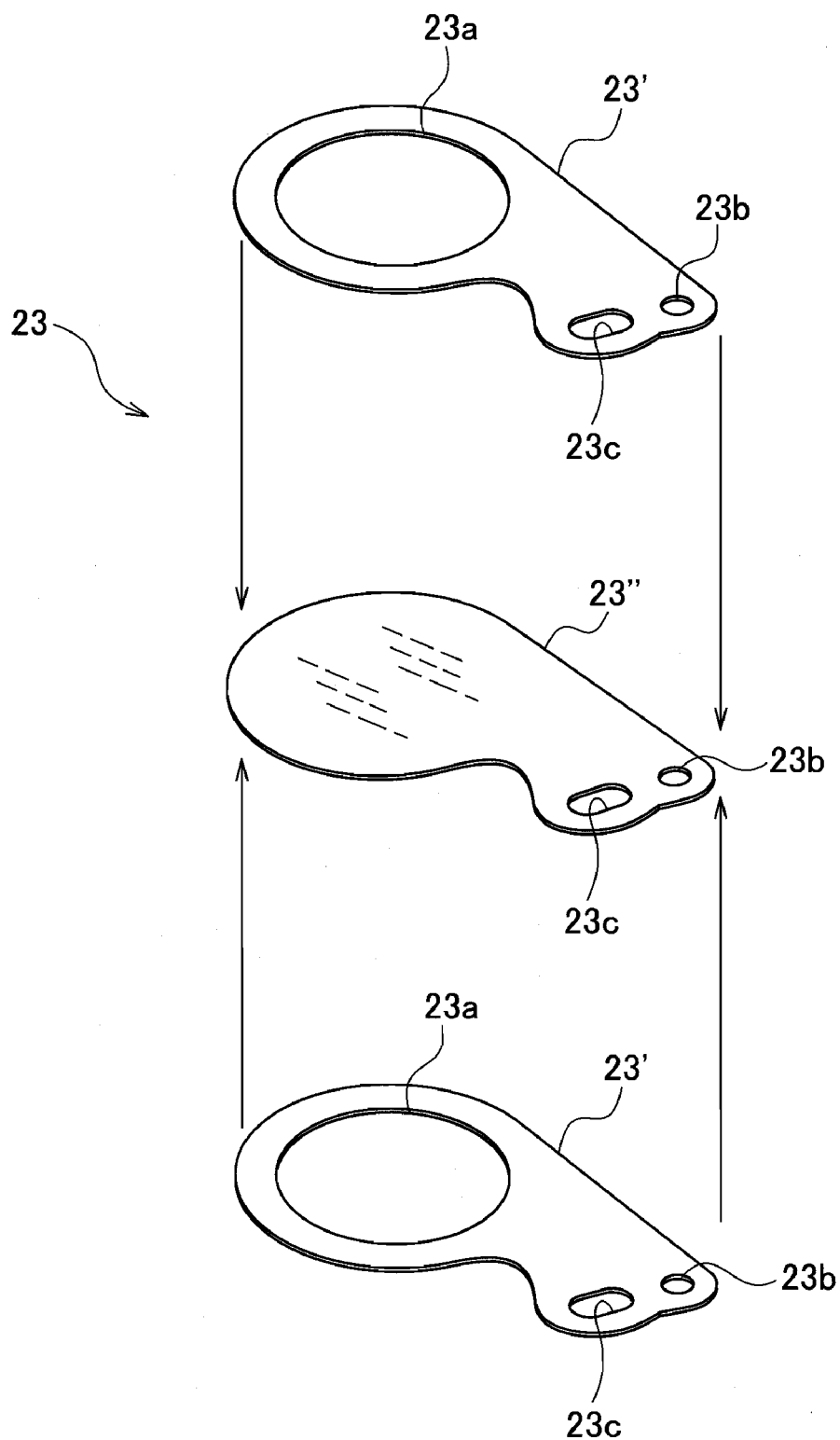
FIG. 6 is an exploded perspective view of an infrared light cut filter blade included in the blade driving unit that is a part of the imaging device.

The infrared light cut filter blade 23 shuts off the ingress of the infrared light to a CCD 24, and as shown in FIGS. 4 to 6, is fabricated such that the film-like infrared light cut filter 23" is sandwiched between a pair of blades 23' formed by plastic or metallic material, and they are integrally joined together by using a technique such as adhesion, welding, caulking, and the like, and the blade is provide with an opening 23a having an aperture wider than the opening portions 21a and 22a serving as the optical paths, a circular hole 23b allowing the support shaft 21c to pass through, and a long hole 23c allowing the driving pin 262b to pass through.

As shown in FIG. 4, the support shaft 21c is inserted into the circular hole 23b, and the driving pin 262b is inserted into the long hole 23c, whereby the infrared light cut filter blade 23 is rotatably supported around the support shaft 21c, and is moved between a position facing the opening portion 21a and a receded position deviated from the opening portion 21a by reciprocal movement of the driving pin 262b in a predetermined range as shown in FIG. 4.

Here, since the infrared light cut filter blade 23 forms a laminating structure of a pair of blades 23' and the infrared light cut filter 23", which have the same contours, the mechanical strength become higher, and can prevent the infrared light cut filter 23" from having a bruise, and moreover, can share a punching tool, thereby reducing the production cost and the like.

The shutter blade 24 opens and closes the opening portions 21a and 22a, and as shown in FIGS. 4 and 5, is made up of the pair of blades formed by thin plate plastic or metal material, and has a circular hole 24b allowing the support shaft 21d to pass through and a long hole 24c allowing the driving pin 272b to pass through.

As shown in FIG. 4, the support shaft 21d is inserted into the circular hole 24b, the driving pin 272b is inserted into the long hole 24c, whereby the shutter blade 24 is rotatably supported around the support shaft 21d, and moves between the receded position (opened position) deviated from the opening portion 21a and the position (closed position) facing the opening portion 21a by the reciprocal movement of the driving pin 272b in a predetermined range as shown in FIG. 4.

The diaphragm blade 25 stops down the opening portions 21a and 22a to a predetermined apertures, thereby adjusting a light quantity passing through the opening portions, and as shown in FIGS. 4 and 5, is made up of one sheet of the blade formed by thin plate plastic or metal material, and has an diaphragm opening 25a having an aperture smaller than the aperture of the opening portion 21a, a circular hole 25b allowing the support shaft 21e to pass through, and a long hole 25c allowing the driving pin 282b to pass through.

As shown in FIG. 4, the support shaft 21e is inserted into the circular hole 25b, the driving pin 282b is inserted into the long hole 25c, whereby the diaphragm blade 25 is rotatably supported around the support shaft 21e, and moves between the receded position (non-diaphragm position) deviated from the opening portion 21a and the position (diaphragm position) facing the opening portion 21a by the reciprocal movement of the driving pin 282b in a predetermined range, as shown in FIG. 4.

Figure 7:
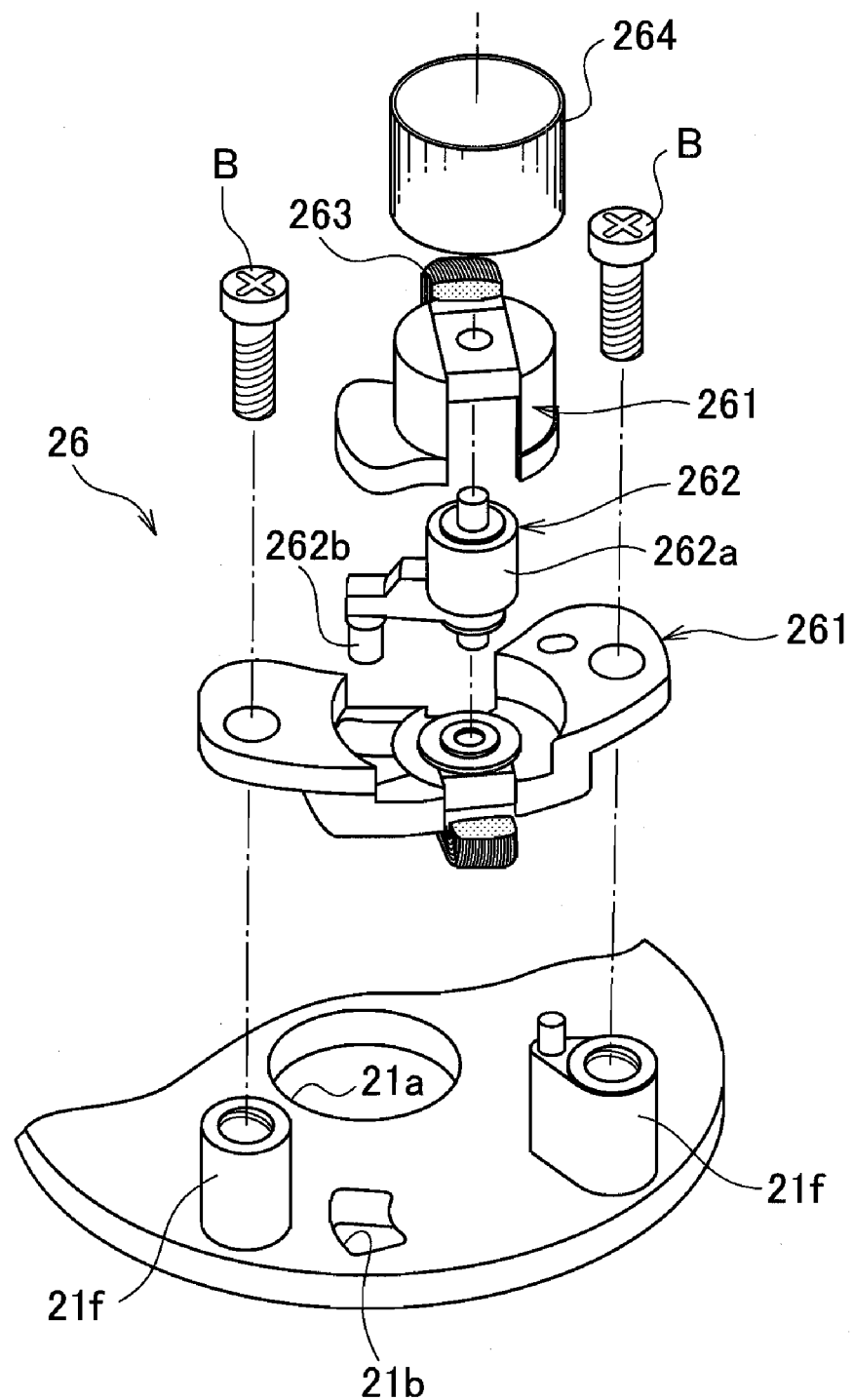
FIG. 7 is an exploded perspective view showing a first electromagnetic driving source for driving the infrared light cut filter blade.

The first electromagnetic driving source 26 drives the infrared light cut filter blade 23, and as shown in FIGS. 4 and 7, is formed by a upper and lower frame members 261 connected to the main plate 21, a rotor 262 having magnet portion 262a magnetized to a N pole and a S pole and a driving pin 262b, an exciting coil 263, a cylindrical yoke 264 coaxially arranged with the rotor 262, iron pins (not shown), and the like. Note that the yoke 264 forms a magnetic path by being fixed to the upper side frame member 261 in the outside of the coil 263, while the iron pins (not shown) are formed so as to generate a magnetic attraction force with the rotor 262, and stop and hold the driving pin 262b at both ends of the operating range in a non-energization state.

The first electromagnetic driving source 26 is fixed to the main plate 21 by the screws B. The rotor 262, with the driving pin 262b being inserted into the long hole 23c of the infrared light cut filter blade 23, pivots in the range defined by the fan-shaped penetration hole 21b, and moves the infrared light cut filter blade 23 between the position facing the opening portion 21a and the receded position.

Figure 8:
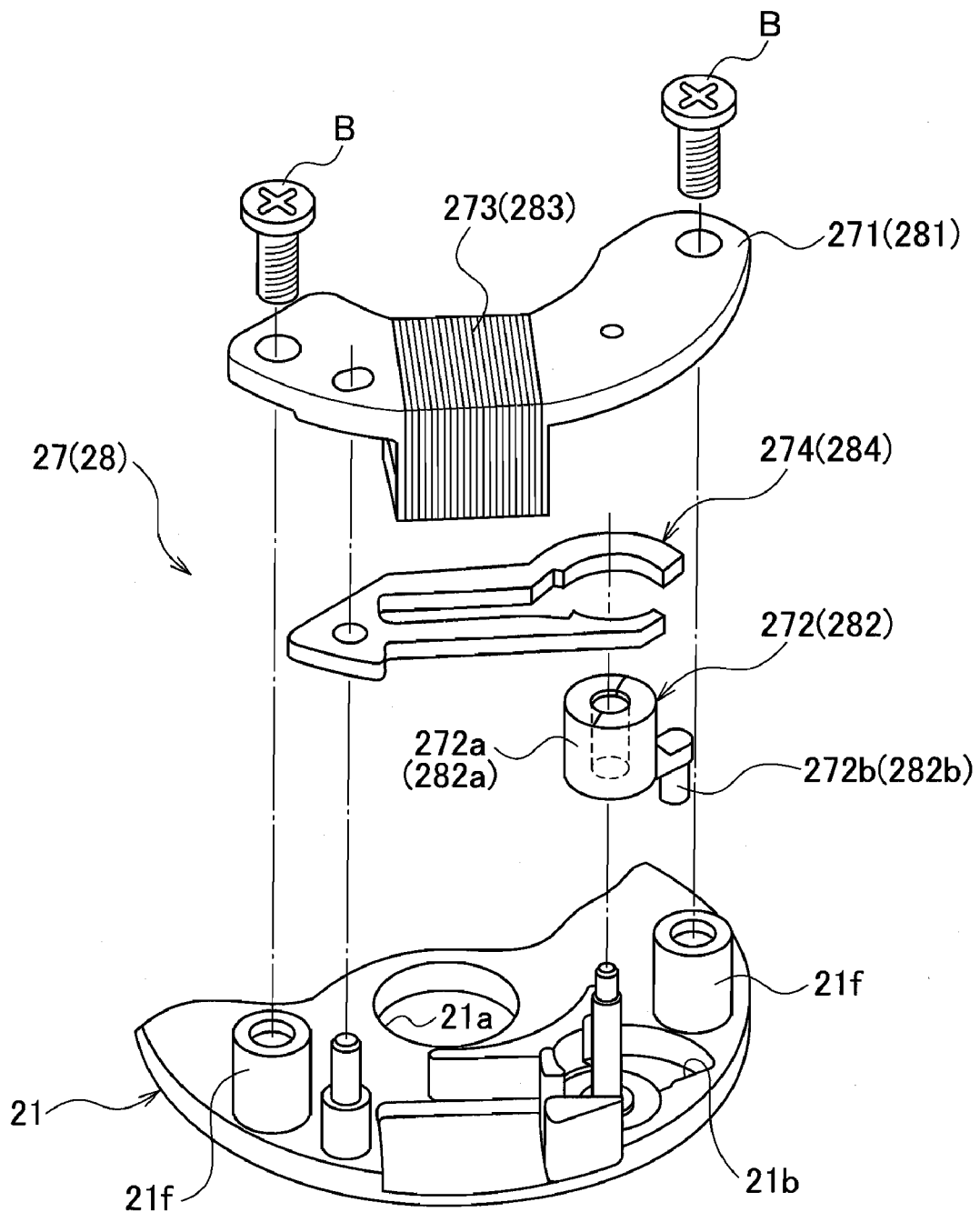
FIG. 8 is an exploded perspective view showing a second electromagnetic driving source for driving a shutter blade and a third electromagnetic driving source for driving a light quantity adjustment blade.

The second electromagnetic driving source 27 drives the shutter blade 24, and as shown in FIGS. 4 and 8, is formed by a pressing plate 271 connected to the main plate 21, a rotor 272 having a magnet unit 272a magnetized to a S pole and a N pole and a driving pin 272b, an exciting coil 273, a yoke 274 formed approximately in the U shape, and the like. Note that the yoke 274 is formed so as to generate a magnetic attraction force with the rotor 272 and stops and holds the driving pin 272b at both ends of the operating range in a non-energization state.

The second electromagnetic driving source 27 is fixed to the main plate 21 by the screws B. The rotor 272, with the driving pin 272b being inserted into the long hole 24c of the shutter blade 24, pivots in the range defined by the fan-shaped penetration hole 21b, and moves the shutter blade 24 between the position facing the opening portion 21a and the receded position.

The third electromagnetic driving source 28 drives the diaphragm blade 25, and as shown in FIGS. 4 and 8, is formed by the same configuration as the second electromagnetic driving source 27, and is formed by a pressing plate 281 connected to the main plate 21, a rotor 282 having a magnet unit 282a magnetized to a N pole and a S pole and a driving pin 282b, an exciting coil 283, a yoke 284 formed approximately in the U shape, and the like. Note that the yoke 284 is formed so as to generate a magnetic attraction force with the rotor 282 and stops and holds the driving pin 282b at both ends of the operating range in a non-energization state.

The third electromagnetic driving source 28 is fixed to the main plate 21 by the screws B. The rotor 282, with the driving pin 282b being inserted into the long hole 25c of the diaphragm blade 25, pivots in the range defined by the fan-shaped penetration hole 21b, and moves the diaphragm blade 25 between the position facing the opening portion 21a and the receded position.

Here, the infrared light cut filter blade 23, the shutter blade 24, and the aperture blade 25, as shown in FIG. 4, are in a state of being rotatably supported by the support shafts 21c, 21d, and 21e which are arranged around the opening portion 21a, and being arranged in the peripheral direction. The first electromagnetic driving source 26, the second electromagnetic driving source 27, and the third electromagnetic driving source 28, as shown in FIG. 4, are also in a state of being arranged around the opening portion 21a in the peripheral direction.

By adopting such arrangement configuration, the integration of the components parts can be performed with the opening portion 21a as a center, and the miniaturization of the imaging device 10 and moreover, the miniaturization of the portable telephone and the like mounting the imaging device 10 can be achieved.

The lens unit 30, as shown in FIGS. 2 and 3, is arranged closer to an object side than the imaging unit 40 (CCD 42) in the direction to the optical axis L, and is formed by a lens frame 31, and a first lens 32, a second lens 33, and a third lens 34, which are fixed to the lens frame 31 respectively, and the like. That is, a lens optical system is formed by the first lens 32, the second lens 33, and the third lens 34.

The imaging unit 40, as shown in FIGS. 2 and 3, is arranged at the back of the lens optical system (the first lens 32, the second lens 33, and the third lens 34) in the direction to the optical axis L, and is formed by a circuit board 41 joined to the back end of the lens frame 31, a CCD 42 as an imaging element fixed to the circuit board 41, various wirings and electronic parts provided on the circuit board 41, a control circuit 50, and the like. That is, the CCD 42 images an object through the lens optical system.

Note that, as the imaging element, not only the CCD 42, but also CMOS and other elements can be applied.

The control circuit 50, as shown in FIG. 9, includes a control unit (CPU) 51 that manages the driving control of the electromagnetic driving sources 26, 27, and 28, and the CCD 42, and the like as well as the entire control, a CCD driving circuit that drives and controls the CCD 42, a first driving circuit 53 that drives and controls the first electromagnetic driving source 26, a second driving control circuit 54 that drives and controls the second electromagnetic driving source 27, a third driving circuit 55 that drives and controls the third electromagnetic driving source 28, an image processing circuit 56 that processes an image imaged by the CCD 42, a storage unit that stores the information (information and the like regarding the blood vessel image of the finger) regarding an operator in advance, a comparing unit 58 for comparing the image information (information regarding the blood vessel image of the finger) on the operator imaged by the CCD 42 with the information (information regarding the blood vessel image of the finger—image information on the operator authorized for the operation) stored in the storage unit 58 in the authentication mode of the operation using the infrared light, a judgment unit 59 for judging a propriety of the operator based on the compared result of the comparing unit 58, and the like.

Here, the control circuit 50 may be directly arranged in the main body 1 or the lid body 3 of the portable telephone so as to drive and control the CCD 42 and the blade driving unit 20 through various wirings.

As an unit controlled by the control circuit 50, as shown in FIG. 9, the display unit 60 that displays the information regarding the judgment result of the judgment unit 59 is provided in the main body 1 or the lid body 3 of the portable telephone, thereby advising the operator of the information. Note that, as the display unit 60, a liquid crystal display unit 3a of the portable telephone may be shared or a dedicated display monitor may be adopted.

Figure 10:
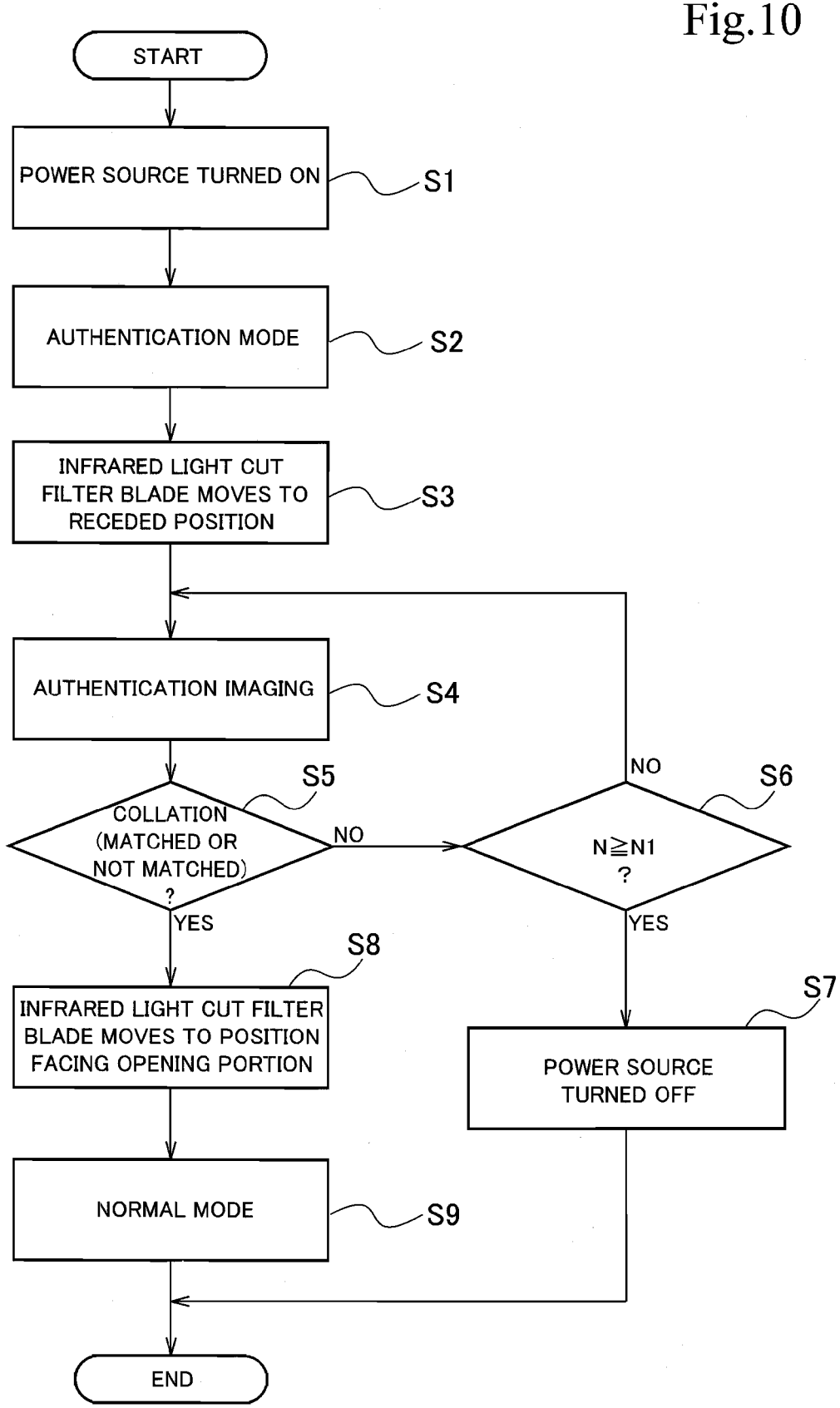
FIG. 10 is a flowchart showing a control operation in an authentication mode in the portable telephone mounting the imaging device.

Next, one example of the operation when this imaging device 10 is mounted on the portable telephone and performs an imaging for authentication will be explained with reference to a flowchart shown in FIG. 10. Note that respective driving controls are managed by a control unit (CPU) 51.

First, when the power of the portable telephone is turned on (step S1), the portable telephone is put into an authentication mode for using the infrared light so as to automatically perform the identification as to whether the operator is a registered person (step S2). Note that, in this authentication mode, unless the operator is authorized, the next operation cannot be performed (even when an operation button 1a is pressed, no reaction is shown).

Subsequently, the first electromagnetic driving source 26 is energized, and the infrared light cut filter blade 23 moves to the receded position deviated from the opening portion 21a (step S3). At this time, even in a state in which an energization is cut off, the infrared light cut filter blade 23 is held at the receded position.

When the operator allows his finger to approach the imaging window 3b, an image for authentication is imaged at a predetermined timing (step S4). At this time, the infrared light contained in the light irradiated on the finger from the outside transmits the finger, and after that, enters the CCD 42 through the lens optical system (the first lens 32, the second lens 33, and the third lens 34), and the CCD 42 forms and images the blood vessel image. The imaged image is subjected to the predetermined processing in the image processing circuit 56 so as to be compared with the information stored in the storage unit 57 in advance.

By the comparing unit 58, the information regarding the image (blood vessel image of the finger) of the operator imaged by the CCD 42 and the information regarding the blood vessel image of the operator registered in the storage unit 57 in advance are compared, and the judgment unit 59 judges (collates) whether both of the information are matched is performed (step S5).

Here, when judged as not matched (inadequate), the number of times N of the authentication is counted (step S6), and when N<N1, the operation returns to step S2 again, and repeats the authentication mode. When N≧N1, the authentication is prohibited, and the power is automatically turned off (step S7). That is, when the judgment unit 59 judges the operator as inadequate, the subsequent operation by that operator is set disenabled. As a result, an unauthorized person can be prevented from taking the liberty of operating the portable telephone.

At this time, the information (for example, the information to the effect that, since the operator in question is an operator not registered, the operation is not authorized) regarding the judgment result is displayed by the display unit 60, so that a warning can be issued.

In this way, the authentication of the operator is reliably performed based on a series of processes such as the imaging of the blood vessel image of the finger and the like of the operator by the CCD 42, the comparison of the storage information and the imaging information by the comparing unit 58, and the judgment by the judgment unit 59, in sequence, and therefore, the authentication can be performed rapidly and at high accuracy.

On the other hand, at step S5, when the images are judged as matched, the first electromagnetic driving source 26 is energized, and the infrared light cut filer 23 moves to the position facing the opening portion 21a (step S8). Even when the first electromagnetic driving source 26 is not energized, the infrared light cut filer blade 23 is held in a state of stopping at the position facing the opening portion 21a.

As a result, the device moves to the normal mode in which a normal object can be imaged without using the infrared light (step S9). Since this normal mode is a state sustained longest, by holding the infrared light cut filter blade 23 in non-energization state, the power consumption can be reduced, and therefore, the miniaturization of the power source and the like can be achieved.

When an object is desired to be imaged in this normal mode, a releasing operation is performed, so that the second electromagnetic driving source 27 is energized, whereby the shutter blade 24 closes the opening portion 21a to complete the shutter operation. In order to adjust the light quantity according to the needs, the third electromagnetic driving sources 28 is energized in advance, so that the diaphragm blade 25 moves to the diaphragm position facing the opening portion 21a, and after that, the second electromagnetic driving source 27 is energized, so that the shutter blade 24 moves to the closed position facing the opening portion 21a, thereby completing the shutter operation.

In the normal mode without using the infrared light, the infrared light cut filter blade 23 is positioned at the position facing the opening portion 21a, and therefore, the infrared light entering the CCD 42 is shut off, a brilliant color imaging image of the object can be obtained.

Note that when such shutter operation or diaphragm operation is required in the authentication mode using the infrared light, a driving control may be performed so that the similar shutter operation or diaphragm operation is performed.

In this way, the infrared light cut filter blade 23 is made movable with respect to the opening portion 21a, so that the normal imaging can be performed in the normal mode without using the infrared light, and at the same time, the biometric information (blood vessel image) on the operator can be also imaged in the authentication mode using the infrared light.

Figure 11:
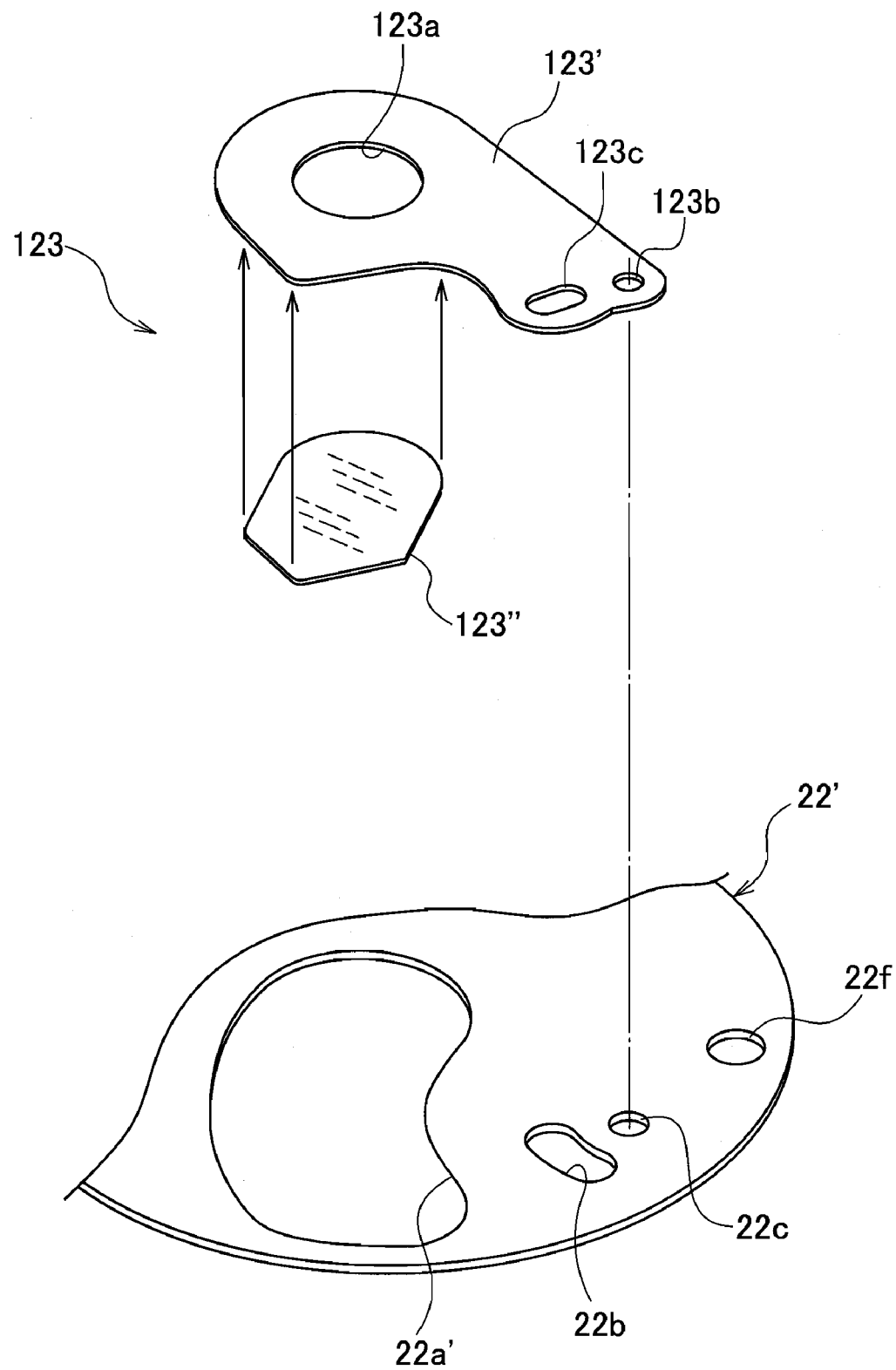
FIG. 11 is an exploded perspective view showing another embodiment of the infrared light cut filter blade.

FIG. 11 is another embodiment of the infrared light cut filter blade. In this embodiment, the infrared light cult filter blade 23 is made up of one blade 123' formed by plastic or metal material and a film infrared light cut filter 123" joined to the rear surface of the blade 123'.

The blade 123' is provided with an opening 123a having a diameter larger than the opening portion 21a, a circular hole 123b allowing the support axis 21c to pass through, and a long hole 123c allowing the driving pint 262b to pass through.

The infrared light cult filter 123" is joined to the one side surface (rear surface) of the blade 123' by the method of adhesion, welding, caulking, and the like so as to at least cover the opening 123a.

When this infrared light cut filer 123 is adopted, the back plate 22' is formed with a long hole-shaped opening portion 22a to avoid an interference with the infrared light cut filer 123". The infrared light cut filer blade 123, as compared with the infrared light cut filer blade 23 of the laminating structure, is made thin and light in weight, and therefore, contributes to the miniaturization of the imaging device 10.

Figure 12:
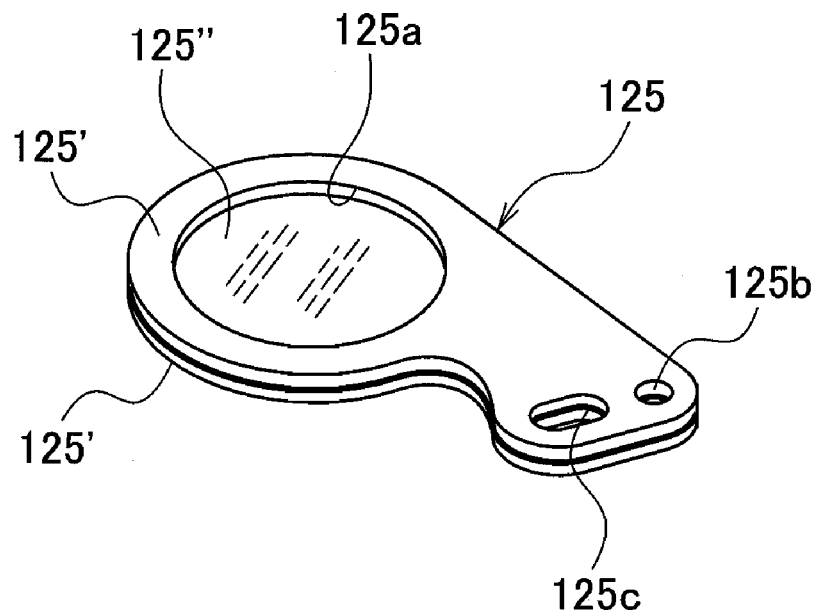
FIG. 12 is a perspective view showing a ND filter blade as the light quantity adjustment blade.

FIG. 12 is an embodiment in the case that a ND filter blade 125 in place of the diaphragm blade 25 is adopted as a light quantity adjustment blade applied to the imaging device 10.

The ND filter blade 125, as shown in FIG. 12, is fabricated such that a film ND filter 125" is sandwiched between a pair of blades 125' formed by plastic or metal material, and they are integrally joined together by the method of adhesion, welding, caulking and the like. The ND filter blade 125 is provided with an opening portions 21a and 22a serving as an optical path, an opening 125a having a diameter larger than the opening portion 21a, a circular hole 125b allowing an support axis 21e to pass through, and a long hole 125c allowing a driving pin 282b to pass through.

In this case also, similarly to the infrared light cut filter blade 23, since the ND filter blade 125 has a laminating structure, the mechanical strength becomes higher, and can prevent the ND filter 125" from being bruised, and can share a punching tool so that the production cost can be reduced.

Figure 13:
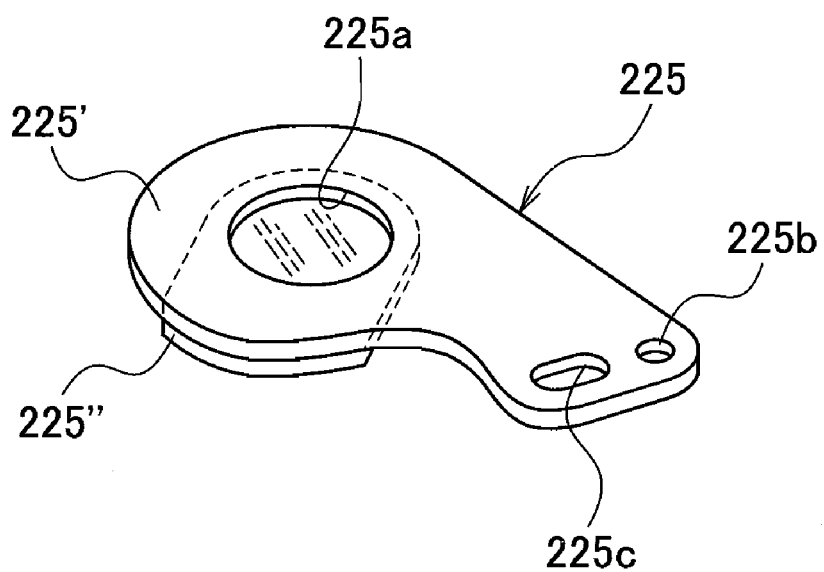
FIG. 13 is a perspective view sowing another embodiment of a ND filter blade as the light quantity adjustment blade.

FIG. 13 is another embodiment in the case that a ND filter blade 225 in place of the diaphragm blade 25 is adopted as a light quantity adjustment blade applied to the imaging device 10.

The ND filter blade 225, as shown in FIG. 13, is made up of one blade 225' formed by plastic or metal material and the film ND filter 225" joined to the rear surface of the blade 225'. The blade 225' is provided with an opening 225a having diameters smaller (or larger) than the opening portion 21a, a circular hole 225b, and a long hole 225c. The ND filter 225" is joined so as to at least cover the opening 225a by the method such as adhesion, welding, caulking, and the like. This ND filter blade 225, as compared with the ND filter blade 125 mentioned above, is made thin and light in weight.

Figure 14:
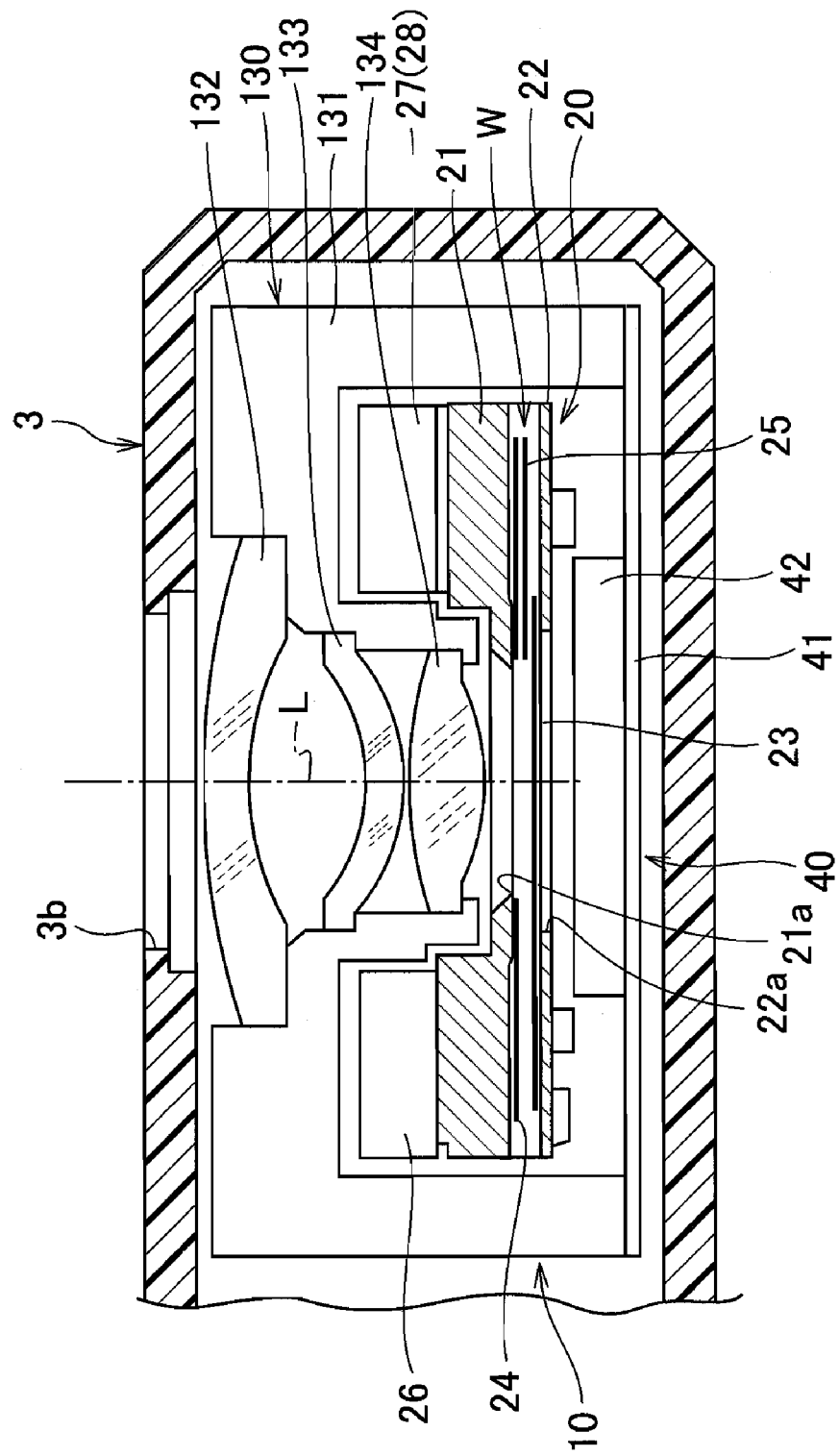
FIG. 14 is a partially sectional view showing another embodiment of the imaging device.

FIG. 14 is another embodiment of the imaging device 10 according to the present invention, and is the same as the embodiment shown in FIG. 2 except that the arranged position of the blade driving unit is changed, and accompanied with this change, the lens unit is changed, and therefore, the same configuration is attached with the same reference numerals, and the explanation thereof will be omitted.

In this embodiment, as shown in FIG. 14, a lens unit 130 is made up of a lens frame 131, and a first lens 132, a second lens 133, and a third lens 134, which are fixed to the lens frame 131 respectively, and the like. That is, a lens optical system is formed by the first lens 132, the second lens 133, and the third lens 134.

The blade driving unit 20 is arranged closer to a CCD 42 (imaging element) side than the lens optical system (the first lens 132, the second lens 133, and the third lens 134) in the direction to an optical axis L.

According to this arrangement, in a state in which the CCD 42 (imaging element) is arranged at the back of the lens optical system (the first lens 132, the second lens 133, and the third lens 134), the blade members of the blade driving unit 20 (an infrared light cut filter blade 23, a shutter blade 24, and an aperture blade 25) are all together arranged further at the back of the lens optical system (the first lens 132, the second lens 133, and the third lens 134), and therefore, while the miniaturization of the entirety is achieved, a suitable arrangement is made particularly when a gap between an imaging window 3b and the first lens 132 is narrow. Since the infrared light filter blade 23 is arranged particularly close to the CCD 42 side, the ingress of the infrared light to the CCD 42 can be more reliably prevented in the normal mode of imaging without using the infrared light.

Figure 15:
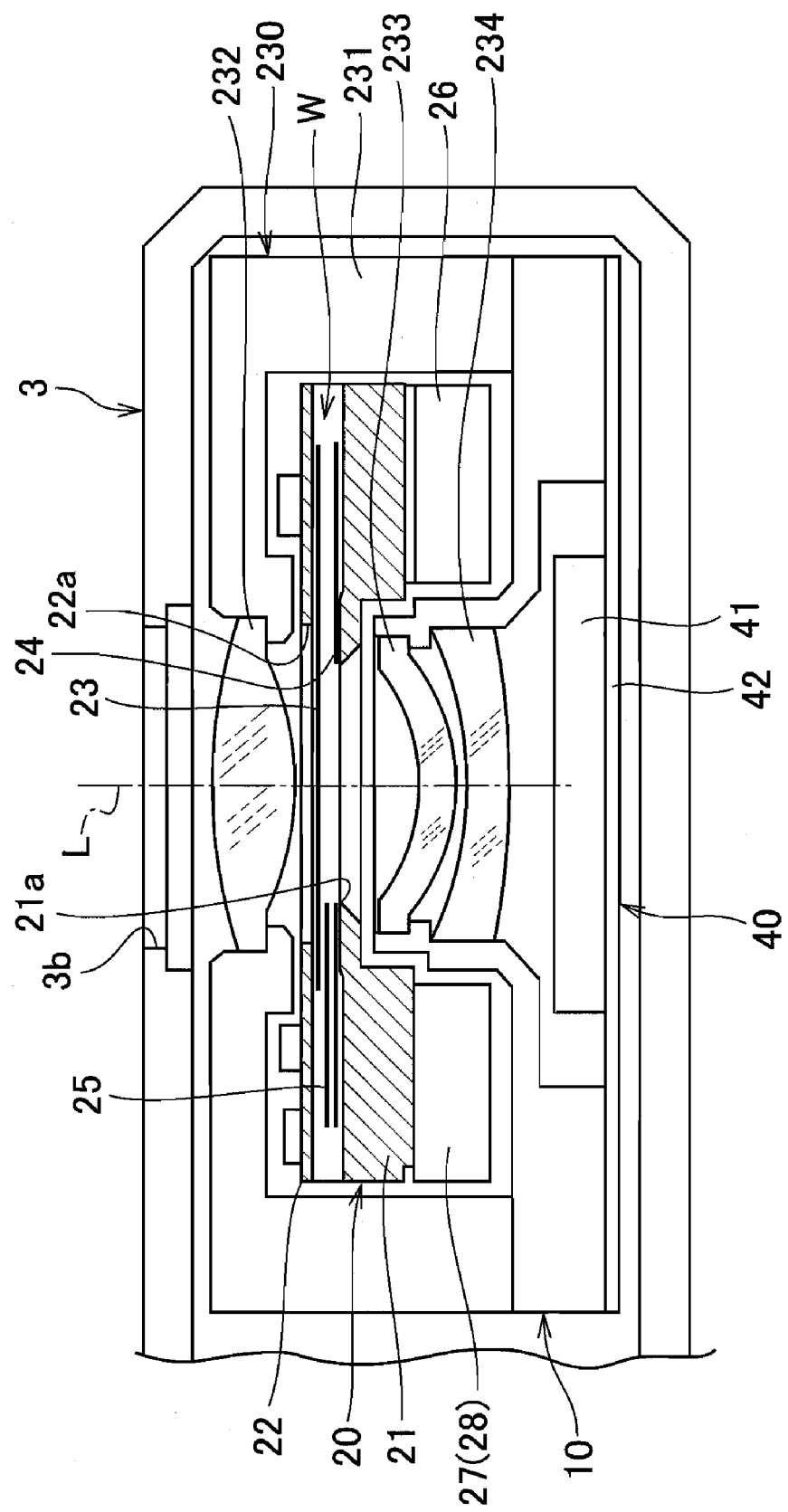
FIG. 15 is a partially sectional view showing still another embodiment of the imaging device.

FIG. 15 is still another embodiment of the imaging device 10 according to the present embodiment, and is the same as the embodiment shown in FIG. 2 except that the arranged position of the blade driving unit is changed and accompanied with this change, the lens unit is changed, and therefore, the same configuration is attached with the same reference numerals, and the explanation thereof will be omitted.

In this embodiment, as shown in FIG. 15, a lens unit 230 is made up of a lens frame 231, and a first lens 232, a second lens 233, and a third lens 234 which are fixed to the lens frame 231, and the like. That is, a lens optical system is formed by the first lens 232, the second lens 233, and the third lens 234.

The blade members of the blade driving unit 20 (an infrared light cut filter blade 23, a shutter blade 24, and an aperture blade 25) are arranged so as to be intervened inside the lens optical system in the direction to the optical axis L, that is, positioned between the first lens 232 and the second lens 233.

According to this arrangement, in a state in which a CCD 42 (imaging element) is arranged at the back of the lens optical system (the first lens 232, the second lens 233, and the third lens 234), the blade members (an infrared light cut filter blade 23, a shutter blade 23, and an aperture blade 25) of the blade driving unit 20 are all together intervened inside the lens optical system (that is, between the first lens 232 and the second lens 233), and therefore, this arrangement is suitable particularly when a gap between the first lens 232 and the second lens 233 is wide, and can achieve the miniaturization of the entirety by effectively utilizing the mutual gap between the lens.

Figure 16:
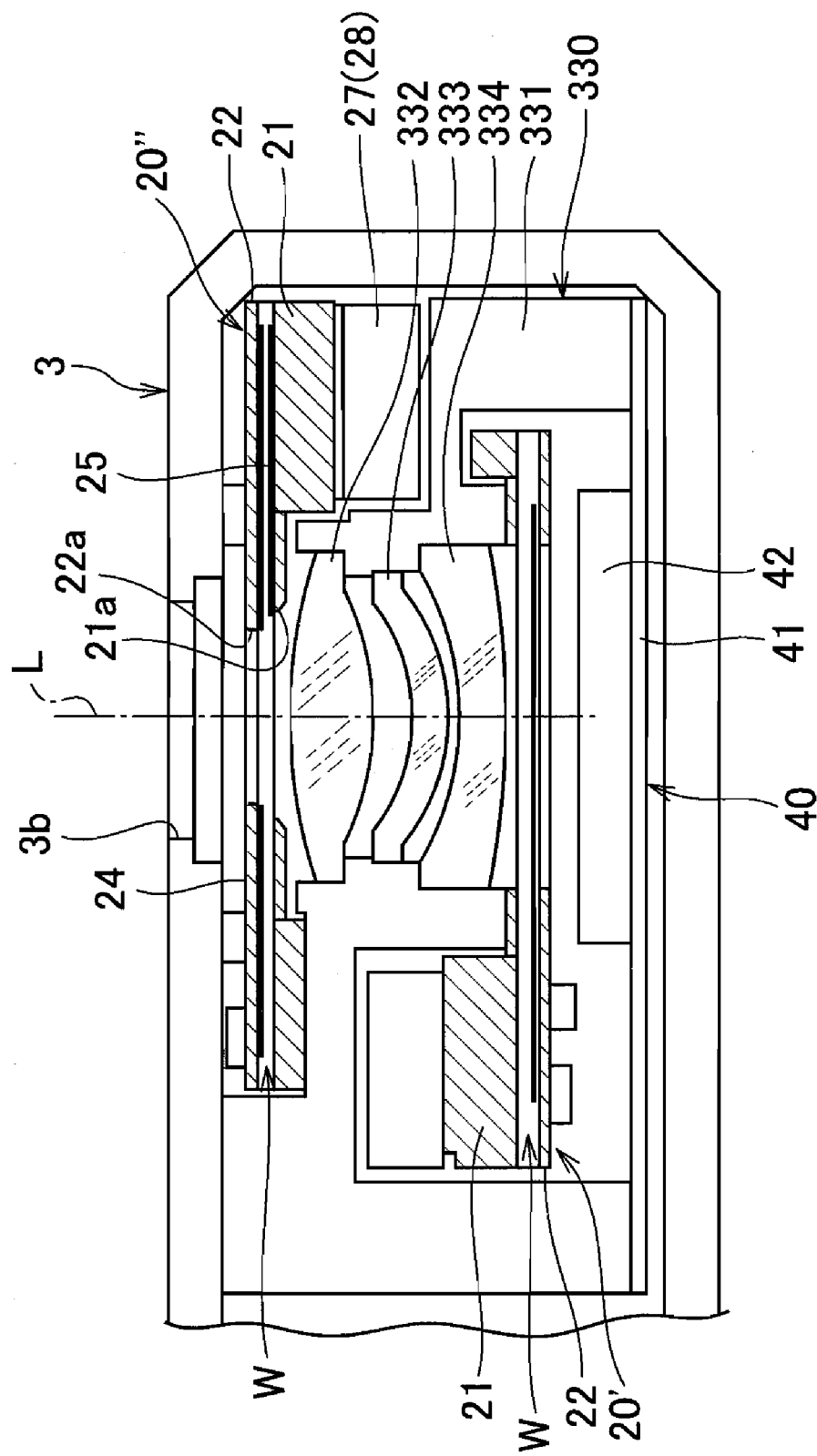
FIG. 16 is a partially sectional view showing still another embodiment of the imaging device.

FIG. 16 is still another embodiment of the imaging device 10 according to the present invention, and is the same as the embodiment shown in FIG. 2 except that the arranged position of the blade driving unit is changed, and accompanied with this change, the lens unit is changed, and therefore, the same configuration is attached with the same reference numerals, and the explanation thereof will be omitted.

In this embodiment, as shown in FIG. 16, a lens unit 330 is made up of a lens frame 331 and a first lens 332, a second lens 333, and a third lens 34 which are fixed to the lens frame 331, and the like. That is, a lens optical system is formed by the first lens 332, the second lens 333, and the third lens 334.

The blade members of the blade driving unit are arranged by being separated into a blade driving unit 20' arranged closer to a CCD42 (imaging unit) side than the lens optical system (a first lens 332, a second lens 333, and a third lens 334) and a blade driving unit 20" arranged closer to an object side than the lens optical system (the first lens 332, the second lens 333, and the third lens 334), in the direction to an optical axis L.

The blade driving unit 20', as shown in FIG. 16, is made up of an infrared light cut filter blade 23, a first electromagnetic driving source 26, a main plate 21, a back plate 22, and the like. The infrared light cut filter blade 23 is in a state of being arranged closer to the CCD 42 side than the lens optical system (the first lens 332, the second lens 333, and the third lens 334), in the direction to an optical axis L.

The blade driving unit 20″, as shown in FIG. 16, is made up of a shutter blade 24, a diaphragm blade 25, a second electromagnetic driving source 27, a third electromagnetic driving source 28, a main plate 21, a back plate 22, and the like. The shutter blade 24 and the aperture blade 25 are in a state of being arranged closer to an object side than the lens optical system (the first lens 332, the second lens 333, and the third lens 334), in the direction to the optical axis L.

According to this arrangement, the shutter blade 24 and the aperture blade 25 are separated together from the infrared light cut filter blade 23, and the shutter blade 24 and the aperture blade 25 are arranged in front of the lens optical system (the first lens 332, the second lens 333, and the third lens 334) and the infrared light cut filer blade 23 is arranged at the back of the lens optical system (the first lens 332, the second lens 333, and the third lens 334), and therefore, this arrangement is suitable when the gap between an imaging window 3b and the first lens 332 and the gap between the third lens 334 and the CCD42 are narrow. Since the infrared light cut filter blade 23 is arranged close to the CCD 42 side, the ingress of the infrared light to the CCD 42 can be more reliably prevented in the normal mode that performs the normal imaging without using the infrared light.

In this embodiment, while the case has been explained where the infrared light cut filter blade 23 is arranged, relative to the lens optical system, close to the CCD 42 side and the shutter blade 24 and the aperture blade 25 are arranged close to an object side, the present invention is not limited to this case, and on the contrary, the infrared light cut filter blade 23 may be arranged close to an object side relative to the lens optical system, and the shutter blade 24 and the aperture blade 25 may be arranged close to the CCD 42 side relative to the lens optical system.

In the embodiments explained above, while the case has been shown where the imaging device 10 includes the infrared light cut filter blade 23, the shutter blade 24, and the aperture blade 25 as a blade member, and includes the first electromagnetic driving source 26, the second electromagnetic driving source 27, and the third electromagnetic driving source 28 as an electromagnetic driving source, it is appreciated that the configuration is not limited to this case, and as the blade members and the electromagnetic driving sources, a configuration including the infrared light cut filter blade 23 and the first electromagnetic driving source 26 only or configuration including the shutter blade 24 and the second electromagnetic driving source 27 in addition to the infrared light cut filter blade 23 and the first electromagnetic driving source 26 or a configuration including the diaphragm blade 25 and the third electromagnetic driving source 28 in addition to the infrared light cut filter blade 23 and the first electromagnetic driving source 26 may be adopted.

In such configuration of the blade members and the electromagnetic driving sources, the blade member may be arranged at any of a position close to an object side or to the CCD 42 (imaging element) side relative to the lens optical system, and a position intervened inside the lens optical system.

According to this arrangement, in a state in which the imaging element (CCD 42) is arranged at the back of the lens optical system, a freedom on the occasion of arranging the infrared light cut filter blade 23, the shutter blade 24, and the diaphragm blade 25 is increased, and while the miniaturization of the device and the simplification of the structure are achieved, these blades can be freely arranged according to the specifications of the lens optical system.

Note that, though the embodiments explained above are not provided with an aperture plate, an aperture plate may be provided and an opening aperture for exposure may be controlled by this aperture plate.

In the embodiments explained above, while the case has been shown where the imaging device 10 is mounted on the portable telephone, the present invention is not restricted to this case, and the device may be mounted on another portable information terminal device such as a portable personal computer and a portable music player.

INDUSTRIAL APPLICABILITY

As explained above, it is a matter of course that the imaging device according to the present invention is mounted on a portable information terminal device such as a portable telephone, a portable personal player, and a portable music player, and it can be used for the imaging for authentication of operators, and in addition, the device is also useful for the normal imaging and the imaging for authentication when the device is adopted for miscellaneous medical equipment or authentication system and the like in the office.

The invention claimed is:

1. An imaging device, comprising:
   a blade driving unit including a base plate having an opening portion serving as an optical path, a blade member movably supported by the base plate between a receded position displaced from the opening portion and a position facing the opening portion, the blade member including an infrared light cut filter blade that shuts off an infrared light, and an electromagnetic driving source that drives the blade member;
   a lens optical system arranged on the optical path passing through the opening portion;
   an imaging element that images an object through the lens optical system;
   a control unit that drives and controls the blade driving unit and the imaging element and that drives and controls the electromagnetic driving source to move the infrared light cut filter blade to the receded position when using the infrared light;
   a storage unit that stores information regarding an operator in advance;
   a comparing unit that compares image information on the operator imaged by the imaging element when using the infrared light with information from the storage unit; and
   a judgment unit that judges a propriety of the operator based on a comparison result of the comparing unit.

2. The imaging device according to claim 1, wherein the electromagnetic driving source positions and holds the infrared light cut filter blade at the position facing the opening portion in a non-energization state except when using an infrared light.

3. The imaging device according to claim 1, wherein the infrared light cut filer blade is arranged at any of a position close to an object side or to the imaging element side relative to the lens optical system, and a position intervened inside the lens optical system.

4. The imaging device according to claim 1, wherein the blade member includes a shutter blade that opens and closes the opening portion in addition to the infrared light cut filter blade, and
the electromagnetic driving source includes a filter blade electromagnetic driving source that drives the infrared light cut filter blade and a shutter blade electromagnetic driving source that drives the shutter blade.

5. The imaging device according to claim 4, wherein
the infrared light cut filter blade and the shutter blade are arranged at any of a position close to an object side or to the imaging element side relative to the lens optical system, and a position intervened inside the lens optical system.

6. The imaging device according to claim 4, wherein
one of the infrared, light cut filter blade and the shutter blade is arranged close to an object side relative to the lens optical system, and
the other of the infrared light cut filter blade and the shutter blade is arranged close to the imaging element relative to the lens optical system.

7. The imaging device according to claim 1, wherein
the blade member includes, in addition to the infrared light cut filter blade, a light quantity adjustment blade that stops down the opening portion to a predetermined aperture or covers the opening portion so as to reduce a light quantity, and
the electromagnetic driving source includes a filter blade electromagnetic driving source that drives the infrared light cut filter blade and a light quantity adjustment blade electromagnetic driving source that drives the light quantity adjustment blade.

8. The imaging device according to claim 7, wherein
the infrared light cut filter blade and the light quantity adjustment blade are arranged at any of a position close to an object side or to the imaging element side relative to the lens optical system, and a position intervened inside the lens optical system.

9. The imaging device according to claim 7, wherein
one of the infrared light cut filter blade and the light quantity adjustment blade is arranged close to an object side relative to the lens optical system, and
the other of the infrared light cut filter blade and the light quantity adjustment blade is arranged close to the imaging element side relative to the lens optical system.

10. The imaging device according to claim 1, wherein
the blade member includes, in addition to the infrared light cut filter blade, a shutter blade that opens and closes the opening portion and a light quantity adjustment blade that stops down the opening portion to a predetermined aperture or covers the opening portion so as to reduce a light quantity, and
the electromagnetic driving source includes a filter blade electromagnetic driving source that drives the infrared light cut filter blade, a shutter blade electromagnetic driving source that drives to open or close the shutter blade, and a light quantity adjustment blade electromagnetic driving source that drives the light quantity adjustment blade.

11. The imaging device according to claim 10, wherein
support shafts of the infrared light cut filter blade, the shutter blade, and the light quantity adjustment blade are arranged in a periphery of the opening portion, and
the filter blade electromagnetic driving source, the shutter blade electromagnetic driving source, and the light quantity adjustment blade electromagnetic driving source are arranged in the periphery of the opening portion.

12. The imaging device according to claim 10, wherein
the infrared light cut filter blade, the shutter blade, and the light quantity adjustment blade are arranged at any of a position close to an object side or to the imaging element side relative to the lens optical system, and a position intervened inside the lens optical system.

13. The imaging device according to claim 10, wherein
the infrared light cut filter blade is arranged close to one side of an object side and the imaging element side relative to the lens optical system, and
the shutter blade and the light quantity adjustment blade are arranged close to the other side of the object side and the imaging element side relative to the lens optical system.

14. The imaging device according to claim 1, wherein
the infrared light cut filter blade includes a pair of blades defining an opening having a predetermined aperture and an infrared light cut filter sandwiched between and joined to the pair of blades.

15. The imaging device according to claim 1, wherein
the infrared light cut filer blade includes a blade defining an opening having a predetermined aperture and a infrared light cut filter joined to a surface of one side of the blade so as to at least cover the opening.

16. A portable information terminal device, comprising:
a blade driving unit including a base plate having an opening portion serving as an optical path, a blade member movably supported by the base plate between a receded position displaced from the opening portion and a position facing the opening portion, the blade member including an infrared light cut filter blade that shuts off an infrared light, and an electromagnetic driving source that drives the blade member;
a lens optical system arranged on the optical path passing through the opening portion;
an imaging element that images an object through the lens optical system;
a control unit that drives and controls the blade driving unit and the imaging element and manages a control of an entirety and that drives and controls the electromagnetic driving source so as to move the infrared light cut filter blade to the receded position when using an infrared light;
a storage unit that stores information regarding an operator in advance;
a comparing unit that compares image information on an operator imaged by the imaging element when using the infrared light with information from the storage unit; and
a judgment unit that judges a propriety of the operator based on a comparison result of the comparing unit.

17. The portable information terminal device according to claim 16, further comprising:
a display unit that displays an information regarding a judgment result of the judgment unit.

18. The portable information terminal device according to claim 16, wherein when the judgment unit judges an operator as inadequate, the control unit sets a subsequent operation by the operator disabled.

* * * * *